United States Patent
Matsugashita

(10) Patent No.: US 8,330,978 B2
(45) Date of Patent: Dec. 11, 2012

(54) IMAGE PROCESSING APPARATUS AND PRINTING REQUEST MAKING METHOD

(75) Inventor: Hayato Matsugashita, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1085 days.

(21) Appl. No.: 12/236,360

(22) Filed: Sep. 23, 2008

(65) Prior Publication Data

US 2009/0080021 A1    Mar. 26, 2009

(30) Foreign Application Priority Data

Sep. 26, 2007  (JP) ................................ 2007-249780

(51) Int. Cl.
*G06F 15/00*    (2006.01)
*G06K 1/00*    (2006.01)
(52) U.S. Cl. ...................... 358/1.15; 358/1.13; 358/1.14
(58) Field of Classification Search .................. None
See application file for complete search history.

(56) References Cited

U.S. PATENT DOCUMENTS 6,785,727 B1 *  8/2004  Yamazaki ..................... 709/229
7,130,068 B1 * 10/2006  Ohta ............................. 358/1.15

FOREIGN PATENT DOCUMENTS

JP          7-230515 A       8/1995

* cited by examiner

*Primary Examiner* — Thierry Pham
(74) *Attorney, Agent, or Firm* — Canon USA Inc IP Division

(57) ABSTRACT

The present invention provides an image processing apparatus including a print screen display unit configured to display in a display device a print screen including document information items regarding documents stored in a device which communicates with the image processing apparatus through a network, a print request unit configured to request a server which communicates with the image processing apparatus through the network to print a document corresponding to a document information item selected from among the document information items included in the print screen, and a print-request limitation control unit configured to prevent a new print request from being issued for a period of time from when the print request unit requests the server to print the document to when registration of print reservation information regarding a print reservation of the document in a print reservation information management unit is detected.

9 Claims, 17 Drawing Sheets

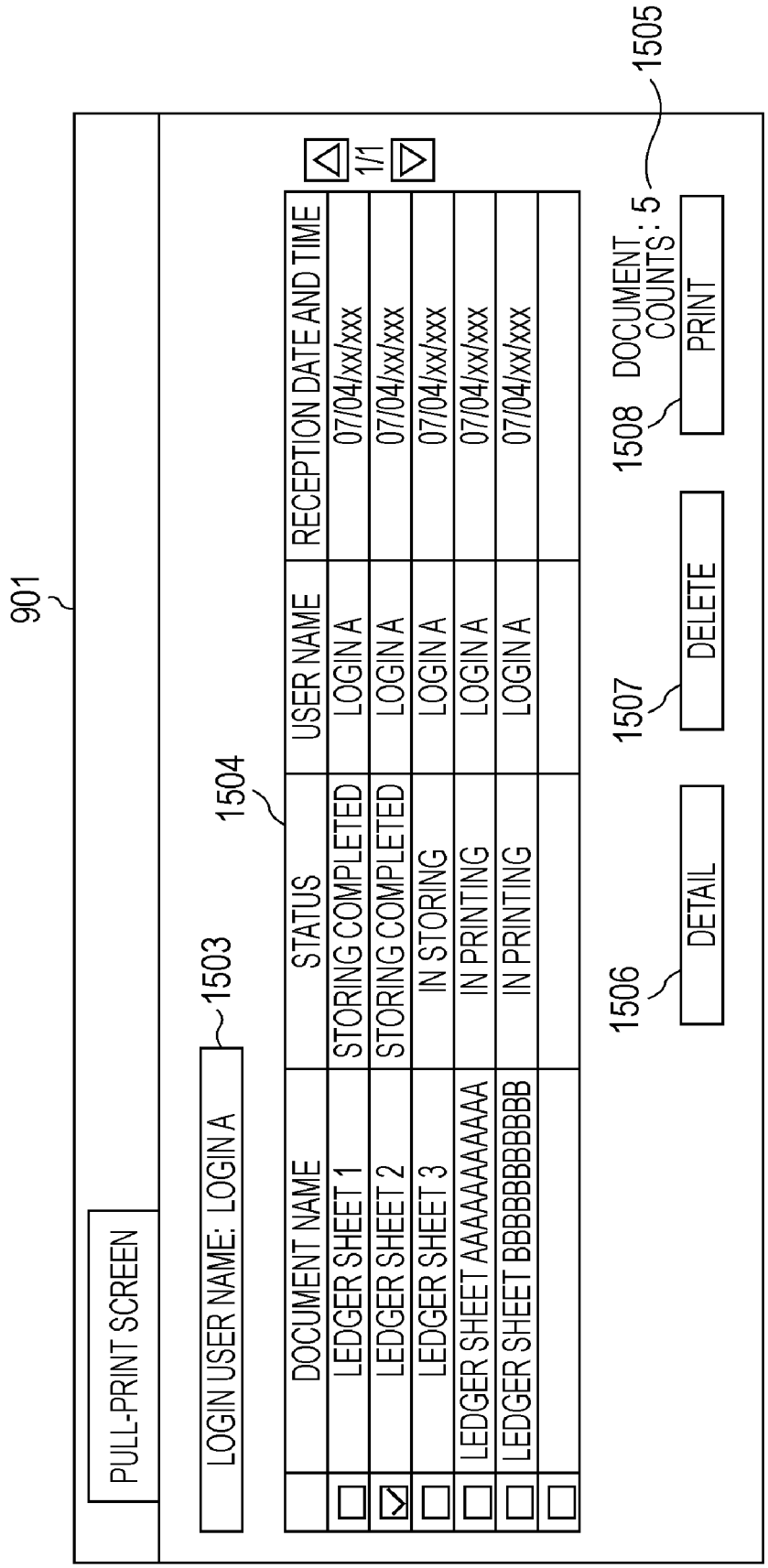

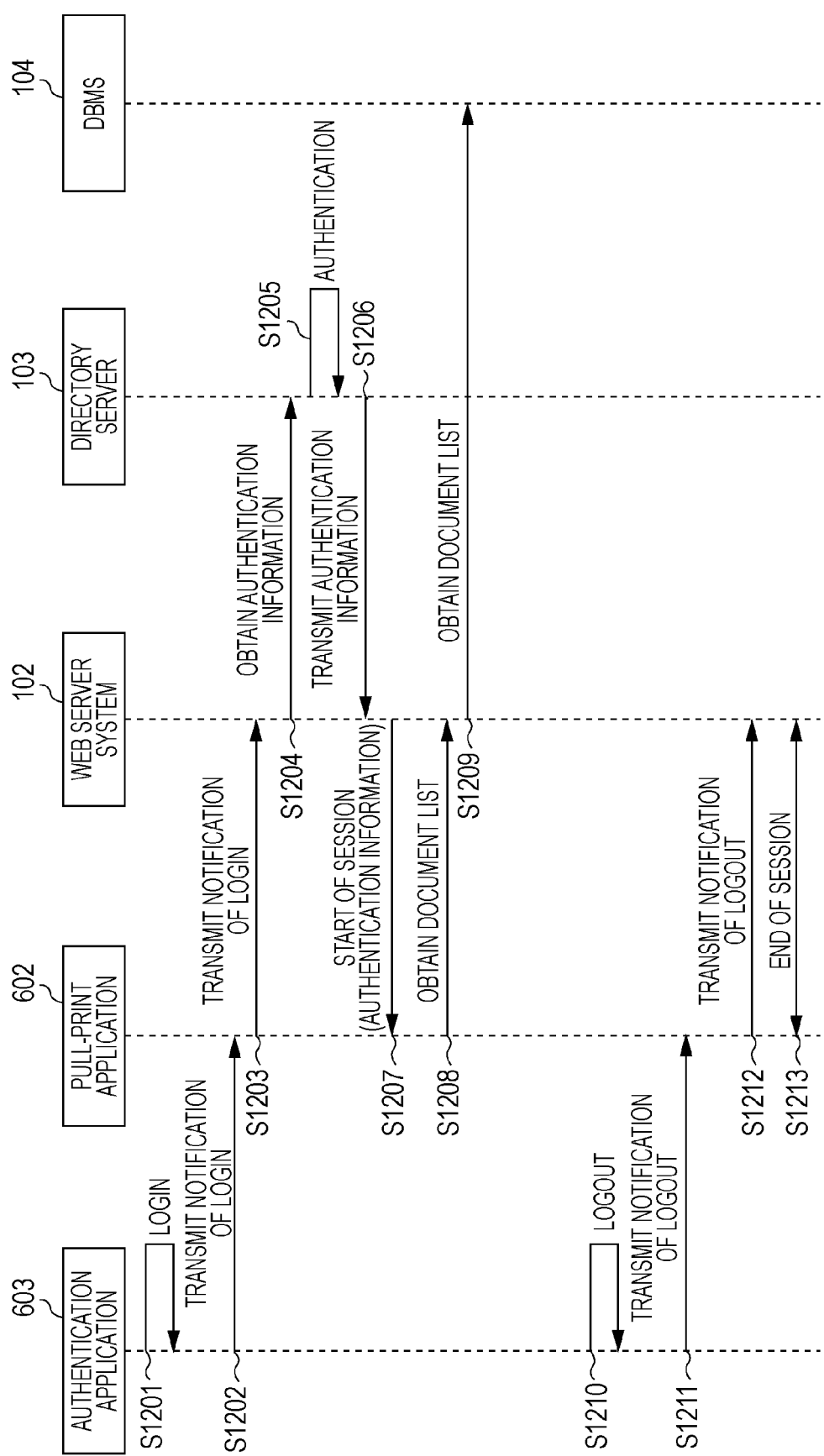

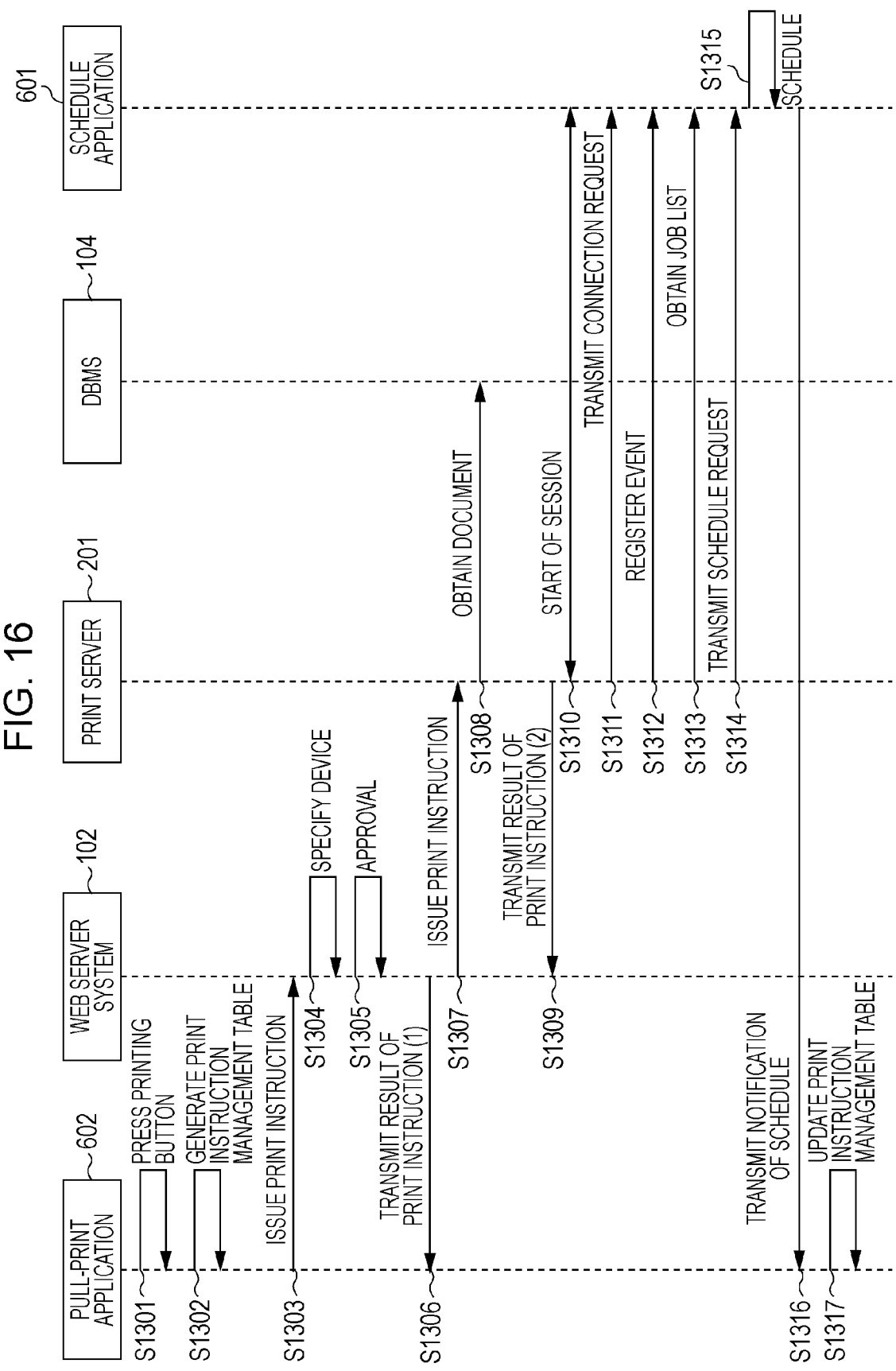

| DOCUMENT ID | ~1801 |
| PRINT INSTRUCTION RESULT | ~1802 |
| DETAILED RESULT | ~1803 |
| ... | |
| | |

| SYMBOL | DESCRIPTION |
|---|---|
| OK | SCHEDULED |
| — | WAITING FOR INFORMATION |
| NG | ERROR |

IMAGE PROCESSING APPARATUS AND PRINTING REQUEST MAKING METHOD

BACKGROUND OF THE INVENTION

1. Field of the Invention

The present invention relates to an image processing apparatus and a printing request making method.

2. Description of the Related Art

In client-server systems, loads on servers increase as the number of client terminals increase, and therefore, the risk of generation of fatal delays or failures in the systems is present. Furthermore, such risks also exist for printing systems utilizing print servers, and therefore, measures to avoid these risks, such as improving functionalities of servers, or increasing the number of servers, are taken in accordance with the increase in the number of client terminals.

Since the increase in the number of servers directly relates to increase in cost, the number of servers should not be increased haphazardly. Therefore, it is important to recognize loads to which the client terminals and the servers are subjected to, and thereafter, increase the number of servers.

Furthermore, in the printing systems utilizing the print servers, it is important to show to users progress of printing operations performed in the print servers from the viewpoint of usability.

Japanese Patent Laid-Open No. 7-230515 discloses a method for allowing progress of processing performed between a client terminal and a server to be recognized from an amount of data transmitted between the client terminal and the server.

In addition, in printing systems in the related art, progress is recognized from the number of sheets printed by devices.

Moreover, as a method for allowing progress of processing performed using a server to be recognized, a method for periodically performing polling from a client terminal to a server is taken as an example. However, in this method, there may arise a problem in that the polling operation itself may become a load for the server.

In printing processing through a network, there arises a problem in that information leaks may occur due to a printed sheet being abandoned or a user forgetting to take a printed sheet. Therefore, there is a demand for a printing system in which a printed sheet is securely obtained by a user who instructed printing processing.

To meet this demand, a printing system called a "pull-print system" has been provided. In the pull-print system, a client terminal uploads data to be printed to a server, and an actual instruction for printing is issued using a device. Therefore, a printed sheet may be prevented from being abandoned or being forgotten to be taken.

The pull-print system is one of the client-server printing systems, and the client terminal is equivalent to the "device". Therefore, as with the problems described above, it is necessary to allow recognition of progress of processing performed using the server and control a load to which the server is subjected to.

However, when the progress is managed in the pull-print system by the method disclosed in Japanese Patent Laid-Open No. 7-230515, the following problems arise.

In the pull-print system, unlike a system in which a client terminal including data to be printed transmits the data to be printed to a server and instructs performance of a printing operation, data to be printed is managed in the server. Therefore, it is difficult for the client terminal (that is, the device in the pull-print system) to recognize the size of the data to be printed, and therefore, it is difficult to recognize progress. Accordingly, there arises a problem in that it is difficult to control a load to which the server is subjected to.

Furthermore, with the method for managing the progress by the method disclosed in Japanese Patent Laid-Open No. 7-230515 and the method for managing the progress using the number of printed sheets, when a plurality of documents are simultaneously instructed to be subjected to pull-print processing, it is difficult to determine whether a load to which the server is subjected to should be reduced. That is, it is difficult for the client terminal (the device in the pull-print system) to properly recognize the load to which the server is subjected to. Accordingly, there arises a problem in that it is difficult to control the load to which the server is subjected to.

SUMMARY OF THE INVENTION

The present invention has been made in view of the above disadvantages and controls a load to which a server is subjected to.

According to an aspect of the present invention, there is provided an image processing apparatus including a print screen display unit configured to display in a display device a print screen including document information items regarding documents stored in a device which communicates with the image processing apparatus through a network, a print request unit configured to request a server which communicates with the image processing apparatus through the network to print a document corresponding to a document information item selected from among the document information items included in the print screen, and a print-request limitation control unit configured to prevent a new print request from being issued for a period of time from when the print request unit requests the server to print the document to when registration of print reservation information regarding a print reservation of the document in a print reservation information management unit is detected.

According to another aspect of the present invention, there is provided an image processing apparatus including a print screen display unit configured to display in a display device a print screen including document information items regarding documents stored in a device which communicates with the image processing apparatus through a network, a print request unit configured to request a server which communicates with the image processing apparatus through the network to print a document corresponding to a document information item selected from among the document information items included in the print screen, and a polling control unit configured to perform polling for obtaining a result of the request to the server for a period of time from when the print request unit requests the server to print the document to when registration of print reservation information regarding a print reservation of the document in a print reservation information management unit is detected.

According to still another aspect of the present invention, there is provided a print request making method employed in an image processing apparatus, including a print screen display step of displaying a print screen including document information items regarding documents stored in a device which communicates with the image processing apparatus through a network, a print request step of requesting a server which communicates with the image processing apparatus through the network to print a document corresponding to a document information item selected from among the document information items included in the print screen, and a print-request limitation control step of preventing a new print request from being issued for a period of time from when the server is requested to print the document in the print request step to when registration of print reservation information regarding a print reservation of the document in a print reservation information management unit is detected.

According to a further aspect of the present invention, there is provided a print request making method employed in an image processing apparatus, including a print screen display step of displaying in a display device a print screen including document information items regarding documents stored in a device which communicates with the image processing apparatus through a network, a print request step of requesting a server which communicates with the image processing apparatus through the network to print a document corresponding to a document information item selected from among the document information items included in the print screen, and a polling control step of performing polling for obtaining a result of the request to the server for a period of time from when the server is requested to print the document in the print request step to when registration of print reservation information regarding a print reservation of the document in a print reservation information management unit is detected.

The present invention may include a program and a storage medium.

With this configuration, a load to which a server is subjected to is controlled.

Further features of the present invention will become apparent from the following description of exemplary embodiments with reference to the attached drawings.

BRIEF DESCRIPTION OF THE DRAWINGS

FIG. 14 is a diagram illustrating an example of a pull-print screen displayed in accordance with processing of the pull-print application.

FIG. 15 is a diagram illustrating an example of a sequence of processes performed for generating items to be displayed in the screen.

FIG. 16 is a diagram illustrating an example of a sequence of processes when a printing button displayed in the pull-print screen is pressed.

DESCRIPTION OF THE EXEMPLARY EMBODIMENTS

Exemplary embodiments of the present invention will be described hereinafter with reference to the accompanying drawings.

First Exemplary Embodiment

System Configuration

Figure 1:
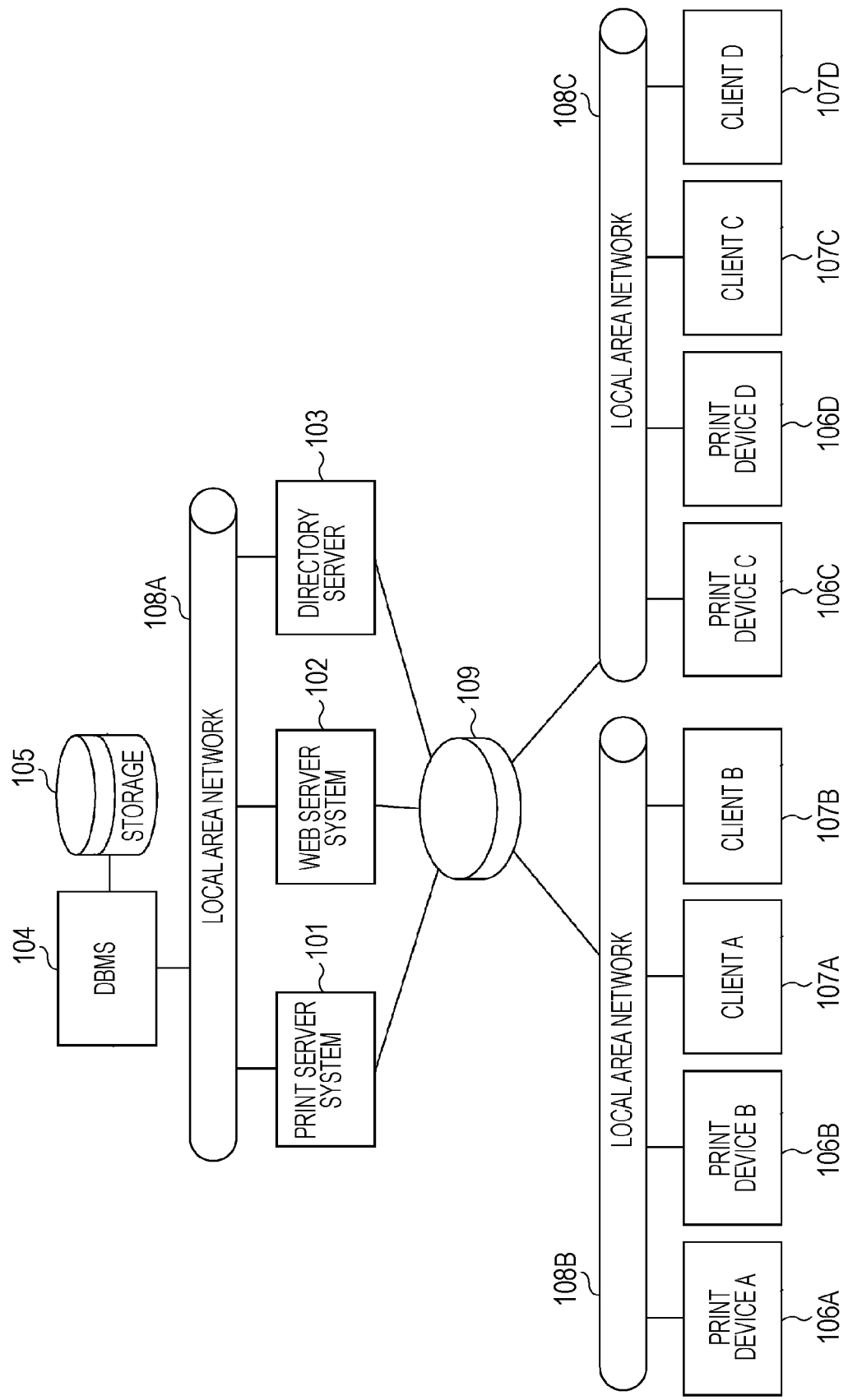
FIG. 1 is a diagram illustrating an example of a configuration of a printing system.

FIG. 1 is a diagram illustrating an example of a configuration of a printing system.

In the printing system, server systems, for example, which control the printing system, printing devices, and client terminals (client computers) are widely connected through a wide area network (hereinafter referred to as a WAN) 109 to one another.

A DBMS (Database Management System) 104 manages document data, print jobs, and data such as printer information which are stored in a storage device 105. Note that the DBMS 104 is software installed in a server computer, for example. A CPU of the server computer performs processing in accordance with the DBMS 104. However, description of this exemplary embodiment is made provided that the DBMS 104 performs the processing for simplicity. The DBMS 104 accepts instructions of updating, obtaining, adding, and deleting of a variety of data from servers, and performs processes in accordance with the instructions.

The storage device 105 may be directly connected to the DBMS 104 so as to serve as a DAS (Direct Attached Storage) or may be connected through the network to the DBMS 104 so as to serve as an SAN (Storage Area Network). Note that in a case of a large printing system, the DBMS 104 (or the server computer including the DBMS 104 installed therein) may have a cluster configuration as a measure to attain load distribution or may have a configuration having a redundancy as a measure to avoid generation of a failure.

A print server system 101 includes a server computer which monitors and manages the printing device, which controls and monitors a print job, and which transfer the print job to the printing device in the printing system. Note that in a case of a large printing system, the print server system 101 also may have a cluster configuration as a measure to attain load distribution or may have a configuration having a redundancy as a measure to avoid generation of a failure.

The print server system 101 is connected through a LAN (Local Area Network) 108A to the DBMS 104 and a web server system 102, and transmits and receives print job data, a printing control instruction, and information on a print job managed in the print server system 101.

The web server system 102 transmits the information on the print job managed in the print server system 101 and document information managed in the print server system 101 through the WAN 109 to front-end client terminals 107A to 107D (hereinafter collectively referred to as a client terminal 107 unless otherwise distinguished). The web server system 102 is a system including a server computer and may have a cluster configuration as a measure to attain load distribution or may have a configuration having a redundancy as a measure to avoid generation of a failure.

Furthermore, the web server system 102 receives print instructions and instructions for print jobs issued from the client terminal 107 and printing devices 106A to 106D (hereinafter collectively referred to as a printing device 106 unless otherwise distinguished), and transmits the instructions to the print server system 101. The web server system 102 collaboratively operates with a directory server 103, which will be described later, so as to perform authentication management of logins from the client terminal 107 and the printing device 106. The web server system 102 stores therein authority information of a user set in advance by a system designer or a creator of a document. Examples of the authority information includes information on an authority for referring to the document, information on an authority for printing, information on authority for deleting, information on an authority for printing using a certain printer, and information on an authority for deleting a print job. The authority information may be stored or managed in the web server system 102 or the DBMS 104.

The directory server 103 is a server computer which performs authentication management of users utilizing combinations of user names and passwords, for example. Note that the user may participate in domain groups. For example, the web server system 102 and the DBMS 104 may set authorities of the domain groups in a range different from ranges of authorities of the respective users. Furthermore, the web server system 102 may set user information or group information, for example, so that the user participates in a plurality of domain groups.

The printing device 106 is connected through a network interface, not shown, to a LAN 108B or a LAN 108C. The LANs 108B and 108C are connected to the WAN 109, and the printing device 106 communicates with the print server system 101 and the web server system 102 through the LANs 108B or 108C and the WAN 109. As the printing device 106, an image processing apparatus such as a laser beam printer employing an electrophotography method or an inkjet printer employing an inkjet method is used as needed. Furthermore, the printing device 106 includes a schedule application (print reservation information management application) 601 which manages a printing schedule (printing reservation information), which will be described later, and a pull-print application 602 which is used to issue a print instruction from the printing device 106. The printing device 106 further includes an authentication application 603 which simultaneously performs a login to the printing device 106 and a login to the web server system 102. An information input device is connected to the printing device 106 so as to communicate with the printing device 106 and perform login to the printing device 106.

The client terminal 107 performs information processing and is connected through the network interface, not shown, to the LAN 108B or the LAN 108C. The LANs 108B and 108C are connected to the WAN 109, and the client terminal 107 communicates with the various server systems through the LANs 108B or 108C and the WAN 109. The client terminal 107 may be a computer to which a persistent storage device is connected or a computer constituted only by a temporary storage device, that is, a computer having a thin client configuration.

Print Server System

Figure 2:
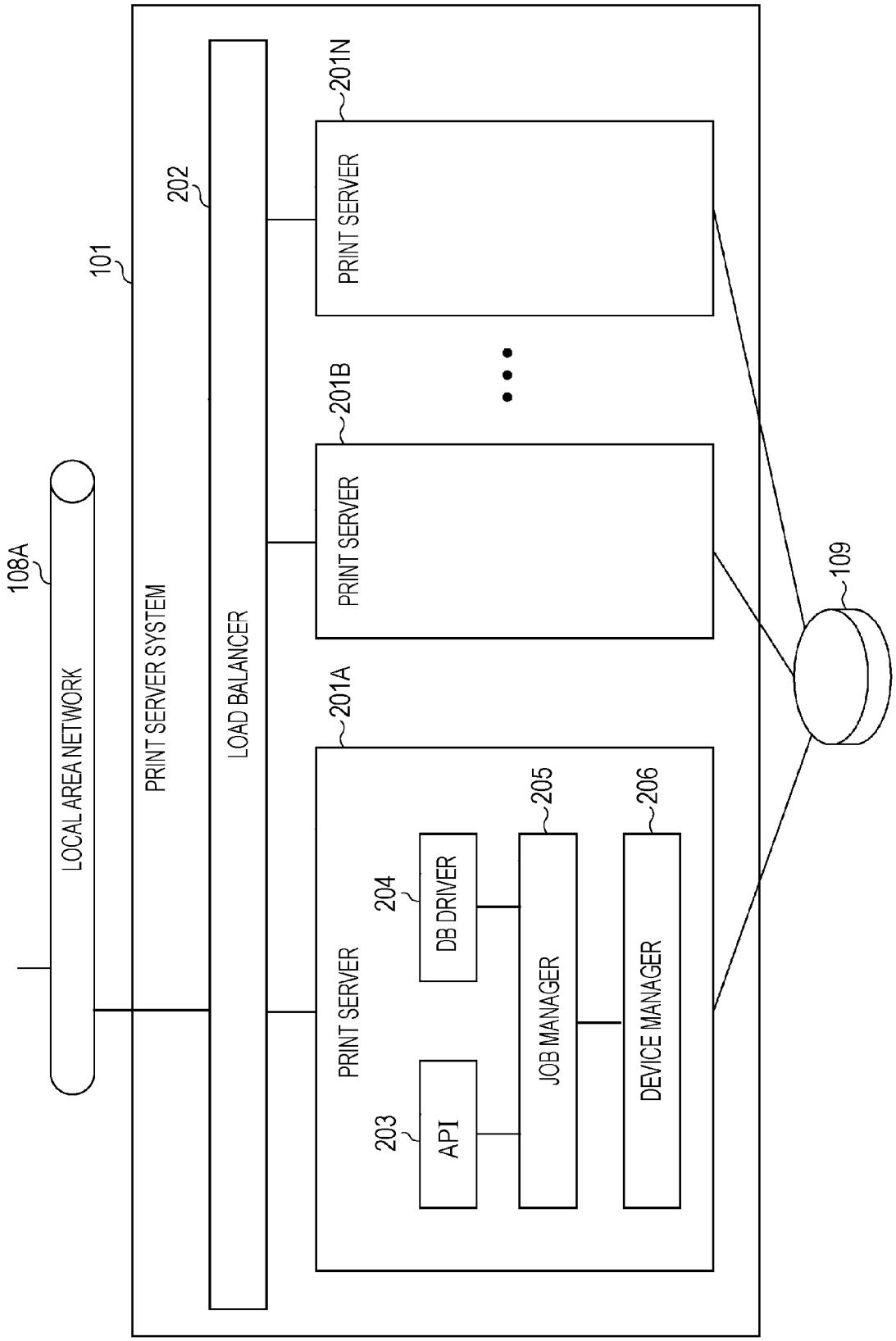
FIG. 2 is a diagram illustrating an example of a configuration of a print server system.

FIG. 2 is a diagram illustrating an example of a configuration of the print server system 101.

As shown in FIG. 2, in the print server system 101, a plurality of print servers (print server computers) 201A to 201N are connected to the LAN 108A through a load balancer 202 serving as a switching system for load distribution. The load balancer 202 recognizes loads to which the plurality of print servers 201A to 201N are subjected to, and preferentially issues requests to print servers among the print servers 201A to 201N to which loads are not applied in order to attain load distribution. The load balancer 202 recognizes the loads to which the print servers 201A to 201N are subjected to by a round-robin method for simply successively circulating a request among the print servers 201A to 201N or a method for periodically transmitting predetermined requests to the respective print servers 201A to 201N and determining times required for replies from the print servers 201A to 201N to be loads.

A functional configuration of one of the print servers 201A to 201N (hereinafter collectively referred to as a print server 201 unless otherwise distinguished) will be described.

The print server 201 includes an API (Application Program Interface) 203, a DB driver 204, a job manager 205, and a device manager 206.

The API 203 registers documents transmitted from the web server system 102 or other servers which generate printable documents, and accepts requests for printing documents and requests for controlling print jobs. Examples of the servers which generate printable documents include ledger sheet servers which generate standard ledger sheets and document management servers which collectively manage documents of users.

The DB driver 204 is a module which communicates with the DBMS 104 when a request for registering a document is received and the document is registered to the directory server 103 or when a request for printing is received and printing data is obtained from the DBMS 104.

The job manager 205 has the following function.

The job manager 205 registers the document received using the API 203 to the DBMS 104 through the DB driver 204. When the DB driver 204 receives a request for printing, the job manager 205 obtains document data to be printed from the DBMS 104 through the DB driver 204 and manages the obtained document data as a print job.

Figure 3:
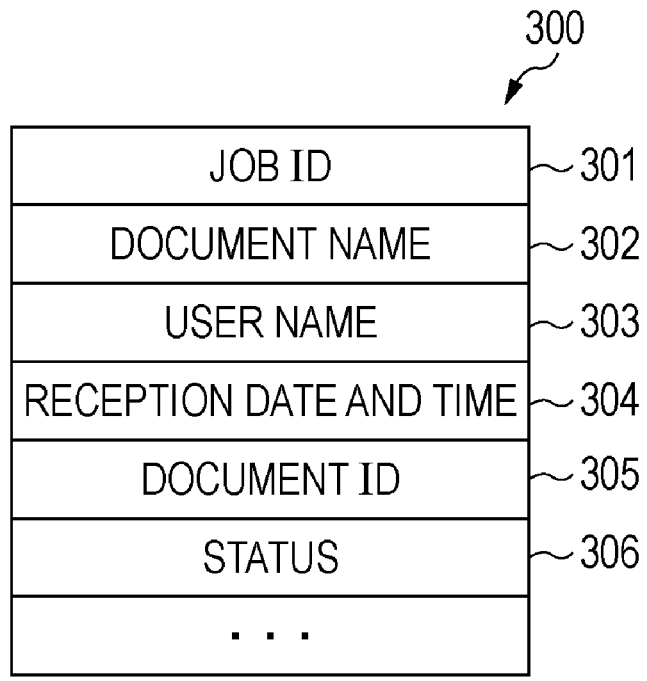
FIG. 3 is a diagram illustrating an example of job information.

The data managed here is job information 300 shown in FIG. 3. FIG. 3 is a diagram illustrating an example of the job information 300. The job information 300 includes a job ID 301, a document name 302, a user name 303, a reception date and time 304, a document ID 305, and a status 306. The job ID 301 represents an identifier of a job. The user name 303 represents an account name of a user who instructed printing. The document ID 305 represents an identifier of a document managed in the DBMS 104. The status 306 represents a status of the print job. Examples of the status include "waiting for reception" representing printer waiting, "transferring" which is shown when printing data is being transferred to the printing device 106, and "printing" which is shown when the printing device 106 is performing printing. The job manager 205 instructs the device manager 206, which will be described later, to print the obtained document using the printing device 106.

Figure 4:
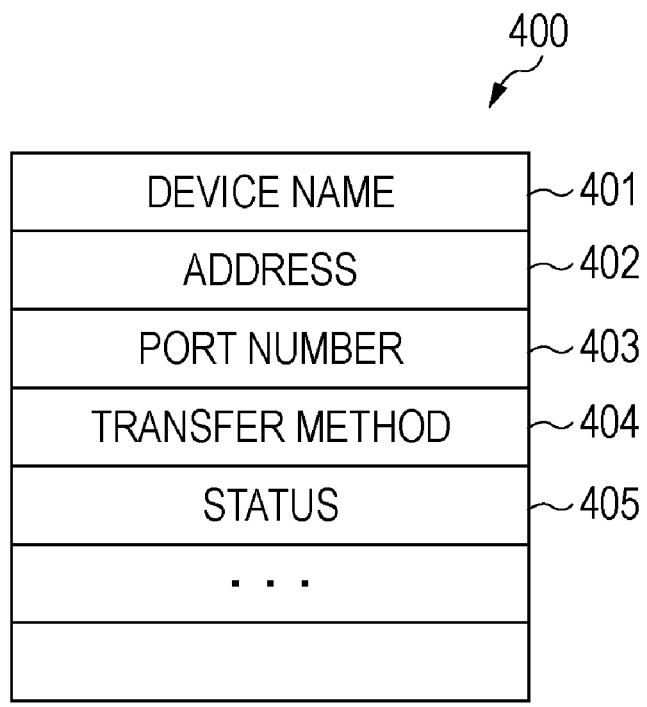
FIG. 4 is a diagram illustrating an example of device information.

The device manager 206 manages device information 400 shown in FIG. 4 and stores a variety of information on the printing device 106 which is used for printing. FIG. 4 is a diagram illustrating an example of the device information 400. The device information 400 includes a device name 401, an address 402 of a communication destination of the device, a communication port number 403, a method 404 for transferring printing data, and a status 405 of the device. Examples of the method for transferring printing data include an RAW method or an LPR (Line Printer Daemon Protocol) method for successively transmitting printing data as streams in accordance with a TCP/IP protocol, and a method for transmitting data in accordance with an HTTP protocol. The device information 400 may be managed in the DBMS 104 instead of the device manager 206 and may be obtained through the DB driver 204 as needed. That is, the data may be stored in any unit. When receiving a request for transmitting printing data from the job manager 205, the device manager 206 starts communicating with the schedule application 601 included in the printing device 106 and successively prints the data. A method for printing the data will be described later in detail.

Hardware Configurations of Server Computer and Client Computer

Figure 5:
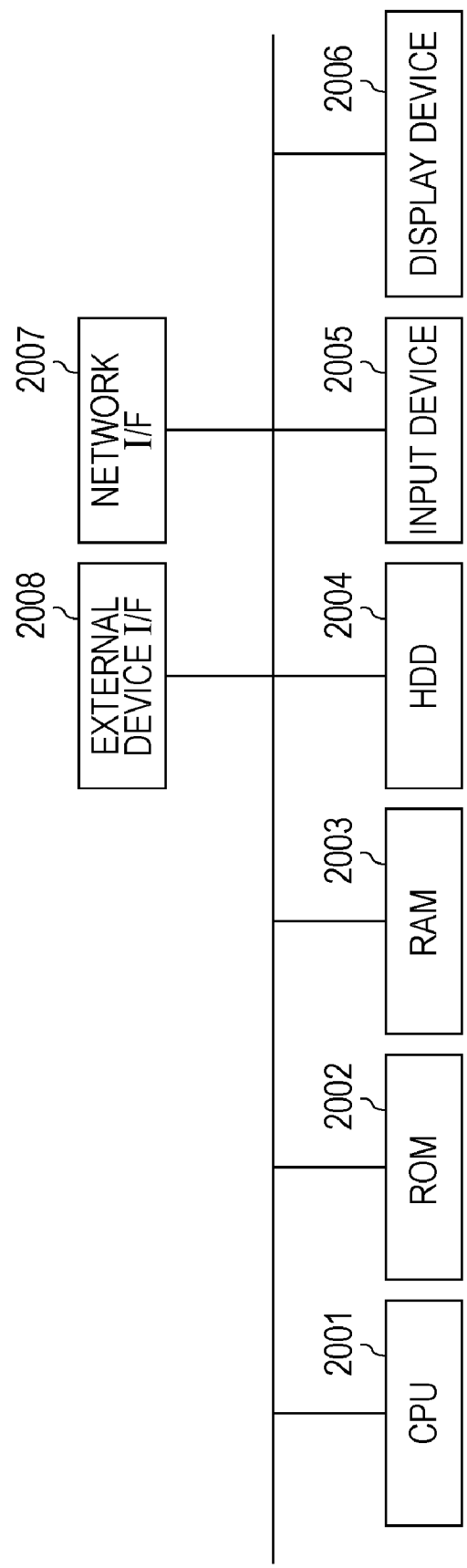
FIG. 5 is a diagram illustrating an example of a hardware configuration of a server computer or a client computer.

FIG. 5 is a diagram illustrating an example of a hardware configuration of one of the server computers or the client computer 107.

A CPU 2001 reads programs stored in a HDD (Hard Disk Drive) 2004 into a RAM 2003, and performs processes in accordance with the programs to thereby perform operations of this device (a server computer or a client computer). A ROM 2002 which is not rewritable stores therein data and the programs regarding the operations performed using this device. The rewritable RAM 2003 electrically stores therein temporary data regarding the operations performed using this device. The programs, the data, and the temporary data, for example, regarding the operations performed using this device are stored in the HDD 2004. An input device 2005 includes a keyboard and a pointing device which accept an input of an instruction to this device. A display device 2006 displays an operation status of this device and information items output as results of the operations performed in accordance with the programs operated in this device. A network I/F 2007 is connected through a network to a corresponding one of the LANs 108A to 108C and the Internet so as to transmit information to or receive information from an external device. An external device I/F 2008 is used to connect an external storage device to this device.

Hardware Configuration of Printing Device

Figure 6:
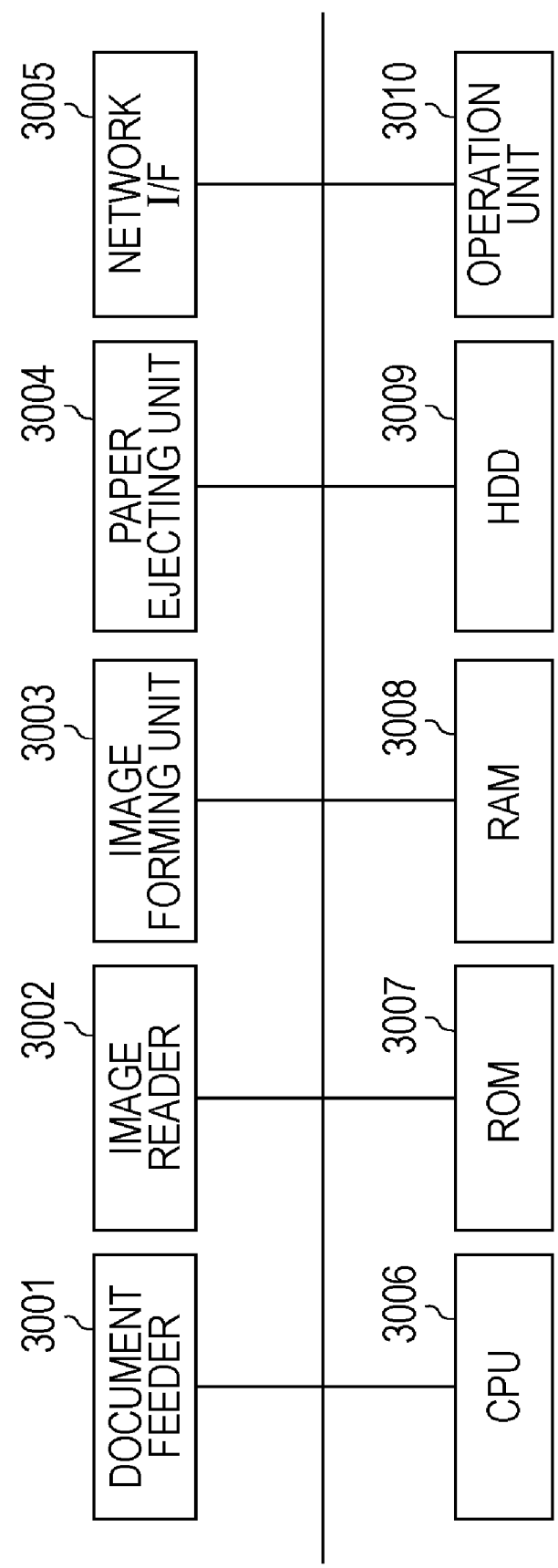
FIG. 6 is a diagram illustrating an example of a hardware configuration of a printing device.

FIG. 6 is a diagram illustrating an example of a hardware configuration of the printing device 106.

An image reader 3002 reads an original using a document feeder 3001. The image reader 3002 and an image forming section 3003 are used to convert the read original or data received through the network into an image for printing and print the image. A paper ejecting unit 3004 ejects sheets which have been subjected to printing and performs a sorting operation and a stapling operation on the ejected sheets, for example. A network I/F 3005 is connected through the network to a corresponding one of the LANs 108B and 108C and the Internet and transmits information to or receives information from an external device. A CPU 3006 reads programs stored in a ROM 3007 or an HDD 3009 into a RAM 3008 and performs processes in accordance with the programs to thereby perform operations using this device (the printing device). The ROM 3007 is a nonvolatile storage unit and stores therein data and programs regarding the operations performed using this device. The rewritable RAM 3008 electrically stores therein temporary data regarding the operations performed using this device. The HDD 3009 stores the programs, the data, and the temporary data regarding the operations performed using this device. An operation unit 3010 displays a screen, which will be described later, and accepts an operation instructed by the user using the screen.

Web Server System

As described above, the web server system 102 has a cluster configuration for load distribution and includes a plurality of web server computers. Web servers installed in the web server computers perform information communications in a WWW (World Wide Web) system and each of the web servers is software.

The web server system 102 has the following function.

The web server system 102 obtains user account information (a user name) and a password in response to a login from the client terminal 107 or the printing device 106 and performs an authentication operation using the directory server 103. When the authentication of the login is successfully performed, the web server system 102 approves an authority of the user for referring to documents. The web server system 102 obtains document information from the DBMS 104 in accordance with the approved authority of reference, and transmits the information to the client terminal 107 or the printing device 106 which has been logged in. Furthermore, when receiving an instruction for printing of a document from the client terminal 107 or the printing device 106, the web server system 102 transmits an instruction for printing to which a document ID is assigned to the print server system 101.

Examples of a policy of approving the reference authority include a policy in which the user can refer to documents of users who belong to the same domain and a policy in which the user can only refer to own documents. The policies may be flexibly designed as policies of the user who introduce the printing system. Furthermore, the web server system 102 may approve not only the authority of reference of documents but also an authority of printing of documents, an authority of deleting a print job, and an authority of promotion.

DBMS

Figure 7:
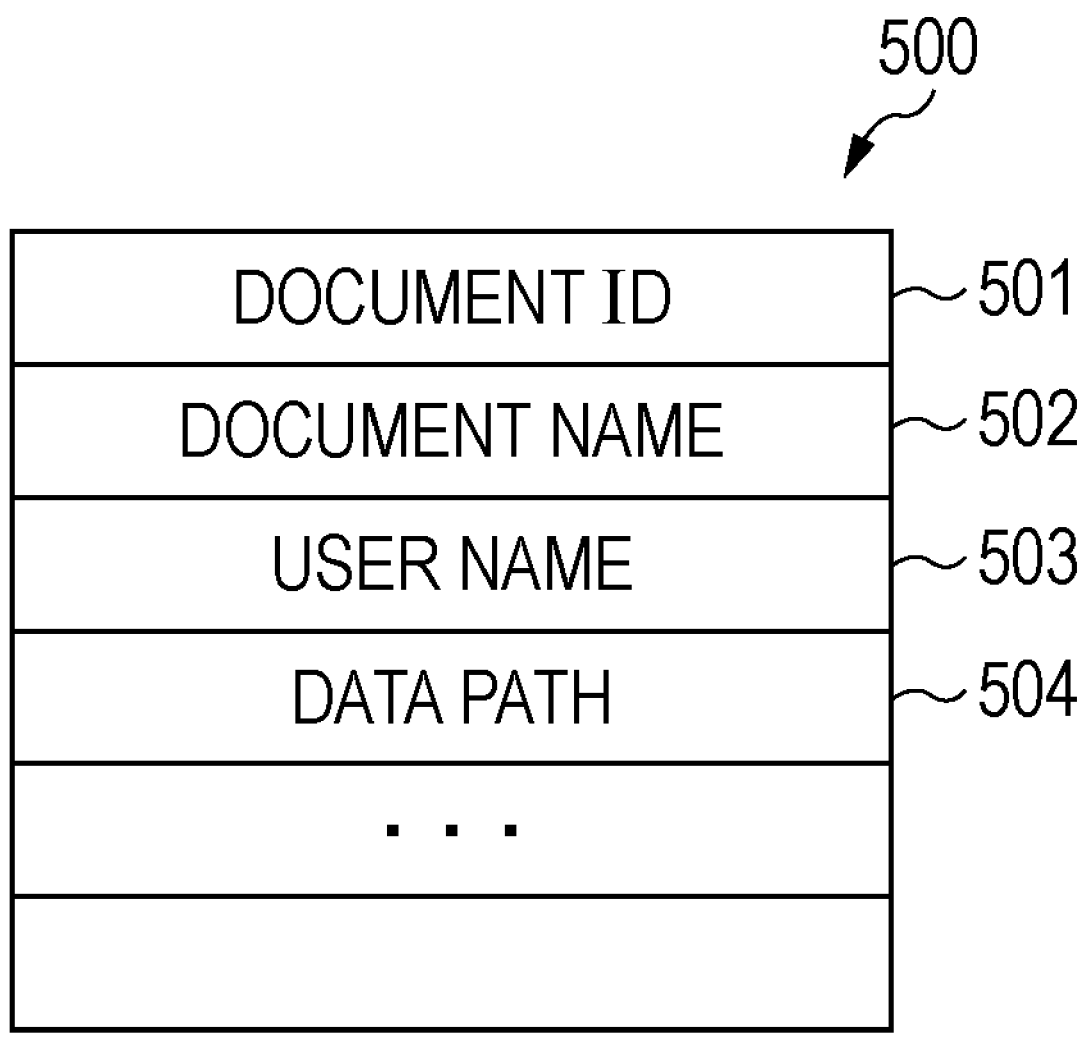
FIG. 7 is a diagram illustrating an example of a document table.

As the DBMS 104, various databases such as a card database, a relational database, or an object database may be employed for managing data. In this exemplary embodiment, a relational database, which has been widely used, is employed as the DBMS 104. The DBMS 104 stores therein a document table 500 as table information. FIG. 7 is a diagram illustrating an example of the document table 500.

The document table 500 includes a document ID 501 which represents an identifier of a document, a document name 502, a user name 503 which represents a name of a user who registered the document, and a data path 504 which represents a location where the document is actually stored. In this embodiment, the document table 500 stores a reference of the document and document data is stored in another unit. However, the document may be directly stored in the document table 500.

The DBMS 104 is used as described below, for example.

The web server system 102 specifies a certain user name and obtains information items regarding documents corresponding to the specified user name from the DBMS 104. The print server 201 specifies a certain document ID and obtains information on a document corresponding to the specified document ID from the DBMS 104. The print server 201 registers a new document in the DBMS 104.

Printing Device

Figure 8:
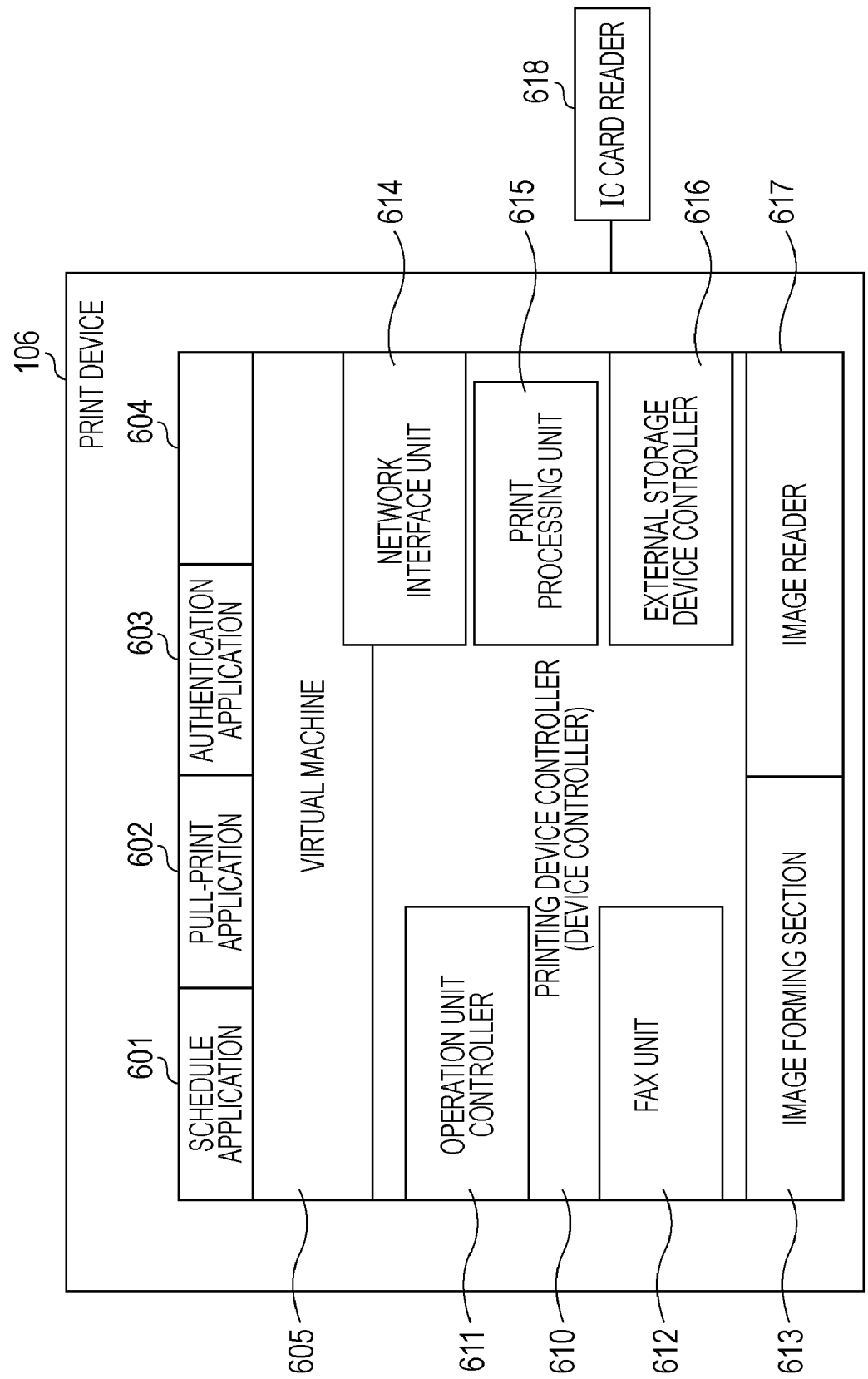
FIG. 8 is a diagram illustrating portions of a software configuration and the hardware configuration of the printing device as a layered configuration.

FIG. 8 is a diagram illustrating portions of a software configuration and the hardware configuration of the printing device 106 as a layered configuration. In FIG. 8, an image forming section 613 corresponding to the image forming section 3003 shown in FIG. 6 executes a series of image forming processes such as a process of handling a sheet, a process of transferring an image, and a process of fixing an image, and forms an image on a recording medium such as a recording sheet. The image forming section 613 includes an inkjet printer and an electrophotographic image forming unit.

An image reading unit 617 corresponding to the image reader 3002 shown in FIG. 6 includes a scanner, for example, optically reads an original image, and converts the original image into digital image information. Furthermore, the image reading unit 617 outputs the digital image information to the image forming section 613 so that the image forming section 613 forms an image on the basis of the digital image information, or supplies digital image information to a fax unit 612 or a network interface unit 614 so that the digital image information is transmitted through a line.

A device controller 610 controls operations of the image forming section 613 and the image reading unit 617 so that original information read using the image reading unit 617 is copied using the image forming section 613, for example. Furthermore, the device controller 610 includes the network interface unit 614, a print processing unit 615, the fax unit 612, and an operation unit controller 611, and controls transmission and reception of information among these units. Note that the device controller 610 corresponds to the CPU 3006, the ROM 3007, the RAM 3008, and the HDD 3009 shown in FIG. 6.

The fax unit 612 performs transmission and reception of a facsimile image. Specifically, the fax unit 612 transmits digital image information read using the image reading unit 617 or decodes a received facsimile signal so as to record information on the signal in the image forming section 613.

The operation unit controller 611 controls the operation unit 3010 to generate a signal in response to a user's operation using an operation panel included in the operation unit 3010, and controls the operation unit 3010 (or a display unit) to display various data items and messages.

The print processing unit 615 processes printing data input through the network interface unit 614, and outputs the printing data to the image forming section 613 so that the printing data is printed. The network interface unit 614 controls transmission and reception of data through a communication line between the printing device 106 and another communication terminal.

A virtual machine 605 is located in a higher level relative to the device controller 610, and controls the device controller 610.

Each of the device controller 610 and the virtual machine 605 directly uses the network interface unit 614 so as to independently access an external network.

Furthermore, applications described by programming languages compatible with an API (Application Programming Interface) provided by the virtual machine 605 are located in a higher level of the virtual machine 605. These applications can act indirectly on the device controller 610 through the virtual machine 605, and can activate the image forming section 613 and the image reading unit 617.

According to this invention, the applications described above correspond to the schedule application 601, the pull-print application 602, and the authentication application 603. Each of these applications can be uninstalled from the virtual machine 605 and newly installed as an application 604.

The applications described above are installed in the printing device 106 in this exemplary embodiment. However, the applications may be provided as hardware. Alternatively, the applications may be included in an external computer connected to the printing device 106 for communication.

An external storage device controller 616 controls the image forming section 613 to convert an image read using the image reading unit 617 into an image having a certain format which can be stored in the external storage device, and stores the converted image to the external storage device. Furthermore, the external storage device controller 616 reads data stored in the external storage device and performs printing processing through the image forming section 613, or externally transmits the data through the network interface unit 614.

In this exemplary embodiment, an IC card reader 618 serving as a login unit is connected to the printing device 106 for communication, and account information of the user is transmitted through the IC card reader 618 to the authentication application 603. Note that the user may login by inputting an instruction using the operation unit (a display panel) managed using the operation unit controller 611, instead of use of the IC card reader 618.

Schedule Application

Figure 9:
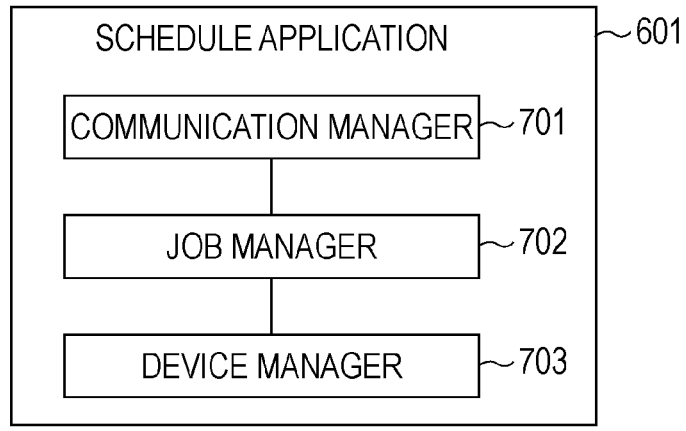
FIG. 9 is a diagram illustrating an example of a functional configuration of a schedule application.

FIG. 9 is a diagram illustrating an example of a functional configuration of the schedule application 601.

The schedule application 601 includes a communication manager 701, a job manager 702, and a device manager 703.

The communication manager 701 allows the print server 201 to be connected, accepts a request from the print server 201, and transmits notification of a change of a status of a print job transmitted from the device controller 610. Note that a sequence of processes of printing will be described later in detail.

The job manager 702 is a module which schedules print jobs transmitted from the print server 201, manages the print jobs, and performs controlling so that printing operations are successively performed as scheduled. Furthermore, the job manager 702 accepts a deleting operation and a promoting operation (priority changing operation) performed by the pull-print application 602 so as to control a print job.

The device manager 703 is a module which communicates with the device controller 610. In addition, the device manager 703 serves as a driver which deletes a print job and catches a change of a state of the print job.

Figure 10:
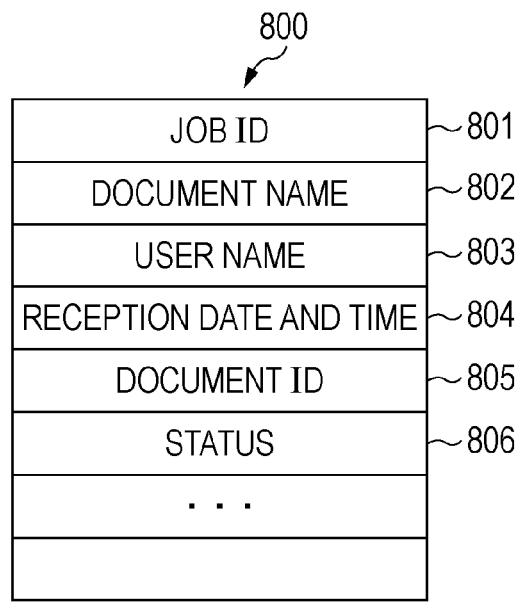
FIG. 10 is a diagram illustrating an example of schedule information of a print job managed in a job manager.

FIG. 10 is a diagram illustrating an example of one of schedule information items 800 of print jobs managed in the job manager 702.

Each of the schedule information items 800 includes a job ID 801 of the print job, a document name 802, a user name 803, a reception date and time 804, a document ID 805, and a status 806 of the print job. Each of the schedule information items 800 basically includes information items similar to those included the job information 300 managed in the print server 201, and therefore, descriptions thereof are omitted.

Authentication Application

The authentication application 603 obtains information on an IC card from the IC card reader 618 connected to the printing device 106 for communication, and obtains a user ID from a user management table stored therein. The user management table is a two-dimensional table including IC card information and user IDs.

Then, the authentication application 603 notifies the pull-print application 602 of the obtained user ID. Furthermore, the authentication application 603 detects a logout of the user and similarly notifies the pull-print application 602 of the logout of the user. Examples of a method for detecting a logout include a method for detecting a press of a hard key included in the printing device 106 and a method for automatically determining that a logout is performed when a predetermined period of time has past after the last time the user performed an operation.

Pull-Print Application

Figure 11:
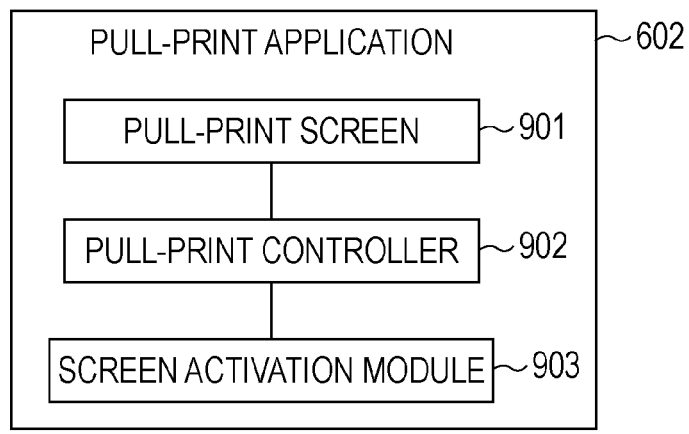
FIG. 11 is a diagram illustrating an example of a functional configuration of a pull-print application.

FIG. 11 is a diagram illustrating an example of a functional configuration of the pull-print application 602. The pull-print application 602 includes a pull-print screen 901, a pull-print controller 902, and a screen activation module 903.

The screen activation module 903 receives a notification of a login or a logout transmitted from the authentication application 603, and transmits the notification to the pull-print controller 902. When receiving the notification of a login, the pull-print controller 902 initializes and generates the pull-print screen 901. The pull-print screen 901 will be described in detail hereinafter.

When receiving the notification of a logout, the pull-print controller 902 discards the generated pull-print screen 901.

Printing Sequence

A printing sequence performed between the print server 201 and the schedule application 601 will be described with reference to FIG. 12.

Figure 12:
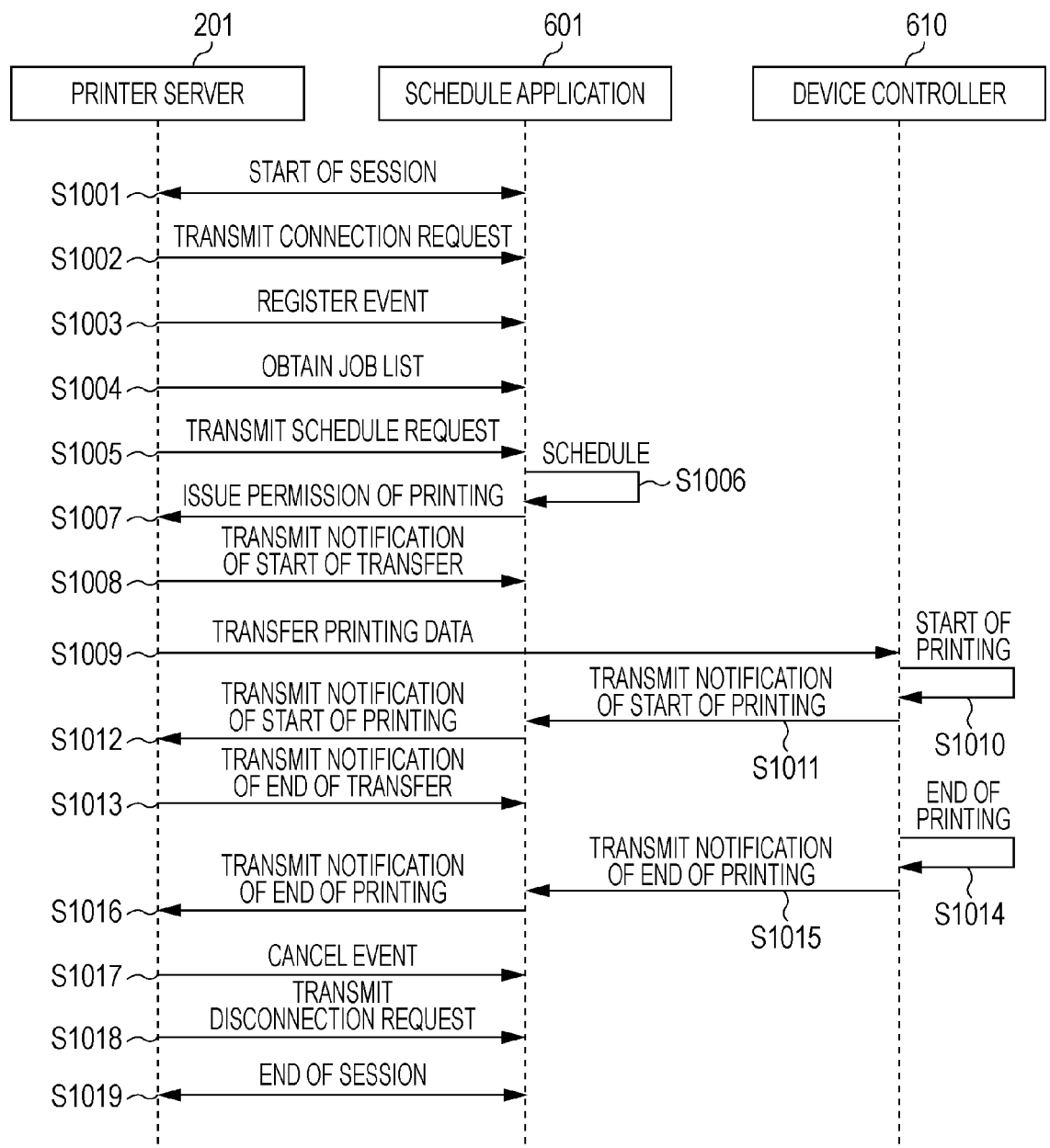
FIG. 12 is a diagram illustrating an example of a sequence of processes of printing performed using a print server, the schedule application, and a device controller.

FIG. 12 is a diagram illustrating an example of a printing sequence performed using the print server 201, the schedule application 601, and the device controller 610.

Note that, although not shown, the schedule application 601 performs an event registration to the device controller 610 when being activated. Therefore, when a state of a print job or the device which is controlled using the device controller 610 is changed, the change of the state is notified to the schedule application 601.

As a printing request, a document ID and a name of a printer which performs printing or an address of the printer are transmitted to the print server 201. The job manager 205 obtains document data from the DBMS 104 through the DB driver 204 in accordance with the document ID. Then, the device manager 206 specifies one of the printing devices 106A to 106D which is used for printing and the printing device 106 performs printing in accordance with the following sequence.

In step S1001, a session of communication between the print server 201 and the schedule application 601 is started. The communication session is established using a communication protocol such as a TCP/IP protocol or an HTTP protocol.

In step S1002, the print server 201 issues a connection request to the schedule application 601. The schedule application 601 receives the connection request using the communication manager 701.

In step S1003, the print server 201 performs an event registration to the device controller 610 so as to receive a notification when a status of a print job or the printing device 106 is changed.

In step S1004, the print server 201 obtains a list (job list) of schedule information items 800 currently managed using the job manager 702 included in the schedule application 601. The obtained list of the schedule information items 800 is transmitted to another application server connected to the print server 201, for example, and is output to a console used to manage the print server 201. Alternatively, a function of transmitting information on a print job through the web server system 102 to the client terminal 107 may be realized.

In step S1005, the print server 201 issues a schedule request of a print job to the schedule application 601. Note that the schedule request includes the job information 300.

In step S1006, the schedule application 601 which received the schedule request adds information to the schedule information items 800 (print reservation information items) which are managed using the job manager 702, newly issues an job ID, and registers the job ID. The job ID is transmitted to the print server 201.

In step S1007, the job manager 702 controls an order of printing so that a printing operation is performed in an order of the list of the schedule information items 800 and issues permission of printing to one of the print servers 201A to 201N which registered the print job corresponding to one of the schedule information items 800 which has currently a turn to be subjected to printing. Examples of a method for controlling the order of printing include a method for controlling the order of printing so that a printing operation is merely performed in an order of registration and a method for controlling the order of printing so that a printing operation is performed in an order obtained by sorting in accordance with priorities assigned to the jobs.

In step S1008, the print server 201 which received the permission of printing, notifies the schedule application 601 of start of transfer of printing data blocks. In step S1009, the print server 201 starts transferring a print job to the device controller 610. The transfer of the print job is performed in accordance with the transfer method 404 set in the device information 400. The schedule application 601 changes the status 806 of a corresponding one of the schedule information items 800 during the transfer.

In step S1010, the device controller 610 successively analyzes the received printing data blocks and starts printing. In step S1011, the device controller 610 changes the status of the print job managed using the device controller 610 itself during printing, and notifies the schedule application 601 which has been subjected to the event registration of the fact that the status is changed to a status in which the printing is started.

In step S1012, the schedule application 601 which received the notification of start of printing through the device manager 703 notifies the print server 201 of the start of printing. As described above, the print server 201 recognizes a status of the print job which is printed using the print server 201 itself.

When the transfer of the print data blocks are completed, the print server 201 notifies the schedule application 601 of the completion of the transfer in step S1013. As with the start of the transfer, the schedule application 601 which received the notification changes the status 806 included in the corresponding one of the schedule information items 800 of the print job so as to represent the completion of the transfer.

When the printing operation using the printing device 106 is terminated in step S1014, as with the start of the printing operation, the device controller 610 notifies the schedule application 601 of end of the printing operation in step S1015. When receiving the notification of the end of the printing operation, the schedule application 601 similarly notifies the print server 201 of the end of the printing operation in step S1016.

When print jobs corresponding to all predetermined printing requests are completed, the print server 201 which received the notification of the end of the printing operation cancels the event to the schedule application 601 in step S1017, and subsequently, the print server 201 transmits a disconnection request to the schedule application 601 in step S1018.

When receiving the notification of the cancellation and the disconnection request, the schedule application 601 performs a termination operation of the communication with the print server 201.

Finally, the session established in step S1001 is terminated in step S1019.

The print server 201 thus performs the printing operation using the 106 through the schedule application 601.

Print Job Monitoring Sequence

Hereinafter, monitoring of a print job performed using the pull-print application 602 will be described.

Figure 13:
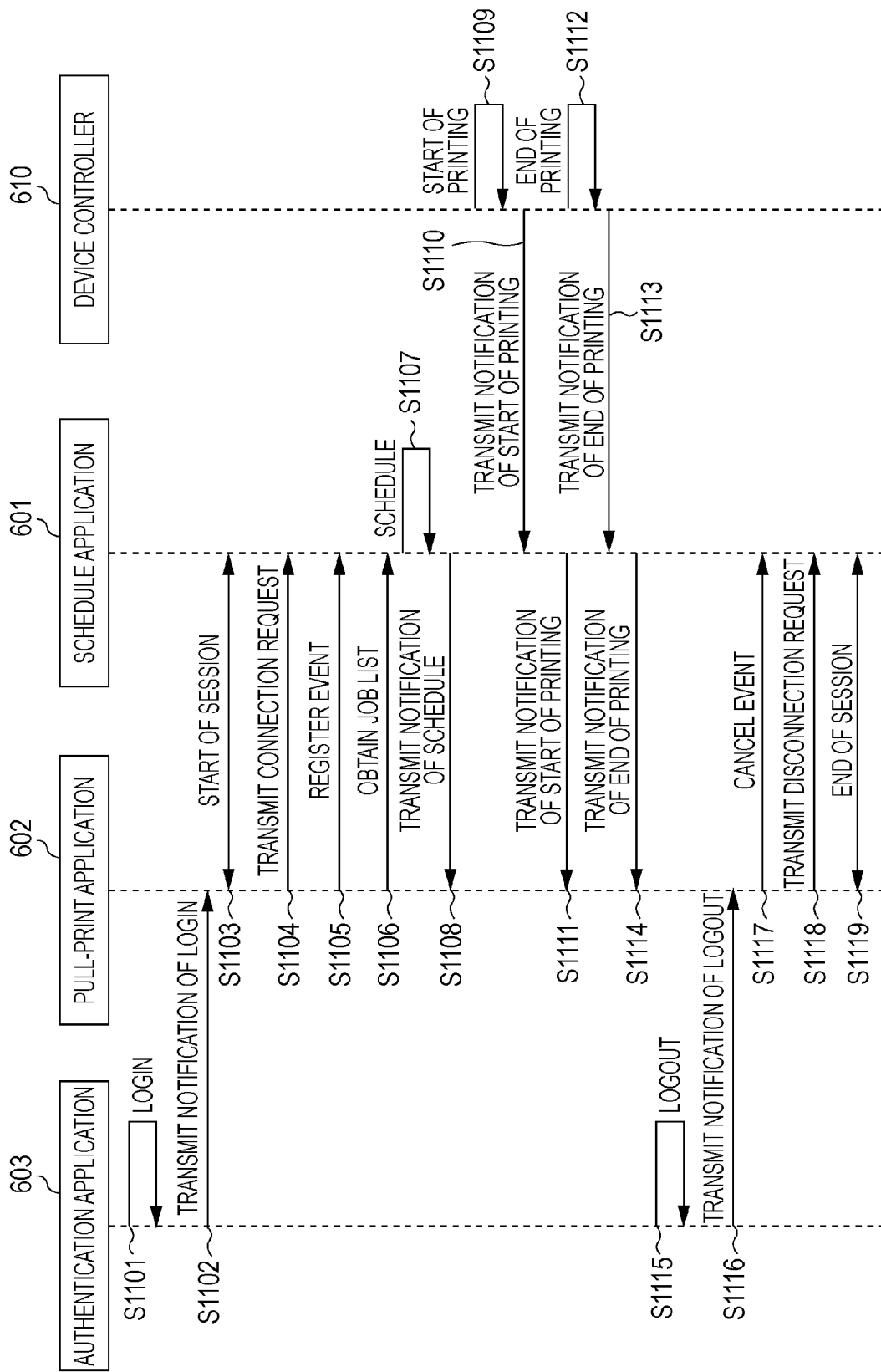
FIG. 13 is a diagram illustrating an example of a sequence of processes of monitoring a print job using the pull-print application.

FIG. 13 is a diagram illustrating an example of a sequence of processes of monitoring a print job using the pull-print application 602.

The authentication application 603 which receives login information from the IC card reader 618 obtains a user account (user ID) in step S1101 and notifies the pull-print application 602 of the login in step S1102. The pull-print application 602 receives the login information using the screen activation module 903 and starts monitoring a print job.

In step S1103, a session of communication between the pull-print application 602 and the schedule application 601 is started. The communication session is established using a communication protocol such as a TCP/IP protocol or an HTTP protocol. However, since the communication is performed using the single virtual machine 605, a method called loopback is employed and communication data is not externally transmitted.

In step S1104, the pull-print application 602 transmits a connection request to the schedule application 601. The schedule application 601 receives the connection request using the communication manager 701. In step S1105, the pull-print application 602 performs an event registration to the schedule application 601 so as to receive a notification when a status of the print job is changed.

In step S1106, the pull-print application 602 obtains a list (job list) of schedule information items 800 currently managed using the job manager 702 of the schedule application 601.

After obtaining the list of the schedule information items 800, the pull-print application 602 registers the list to a print job management table. The print job management table corresponds to a list of job information items 300. An example of the job information items 300 is shown in FIG. 3.

When a new print job is scheduled using the print server 201 in step S1107, for example, the schedule application 601 transmits a schedule notification to the pull-print application 602 in step S1108. When receiving the schedule notification, the pull-print application 602 registers the new print job in the print job management table.

When the device controller 610 updates the status of the print job in step S1109 and step S1112, the schedule application 601 performs the following operation. For example, when receiving a notification of start of printing or end of printing in step S1110 or step S1113, the schedule application 601 transmits a notification of a change of the status to the pull-print application 602 which performs an event registration in step S1111 and S1114. When receiving the change of the status of the print job, the pull-print application 602 updates a status of a print job in the print job management table corresponding to the print job.

When detecting a logout of the user by detecting a press of the hard key, for example, in step S1115, the authentication application 603 notifies the pull-print application 602 of the logout of the user in step S1116. When receiving the notification, the pull-print application 602 transmits a notification of cancellation of the event in step S1117, and thereafter, transmits a disconnection request to the schedule application 601 in step S1118. Then, the session between the pull-print application 602 and the schedule application 601 is terminated in step S1119.

The pull-print application 602 monitors a print job as described above.

Pull-Print Screen Sequence

FIG. 14 is a diagram illustrating an example of the pull-print screen 901 displayed in accordance with processing of the pull-print application 602. FIG. 15 is a diagram illustrating an example of a sequence of processes performed for generating items to be displayed in the screen. The pull-print screen (printing screen) 901 will be described hereinafter with reference to the sequence shown in FIG. 15.

When receiving a notification of a login from the IC card reader 618 in step S1201, the authentication application 603 obtains a user account (user ID) and notifies the pull-print application 602 of the login in step S1202. The pull-print application 602 receives the notification of the login using the screen activation module 903 and generates a pull-print screen. Here, the pull-print application 602 displays a user name corresponding to the obtained user account in a login user name region 1503 in the pull-print screen 901 (print-screen display).

In step S1203, the pull-print application 602 transmits a notification of the login to the web server system 102. Here, the pull-print application 602 utilizes the user account (user ID) obtained from the authentication application 603 as login information. Note that an authentication method using a password may be employed for improvement of security. In this case, the password may be managed in the authentication application 603 so as to correspond to the user ID. Furthermore, the user ID and the password may be input using the screen instead of use of the IC card reader 618.

When receiving the login notification from the pull-print application 602, the web server system 102 transmits an authentication information request to the directory server 103 in step S1204. The directory server 103 refers to user information registered in advance and performs authentication in step S1205. When the authentication was successfully performed, the directory server 103 returns user information and information on a domain group in which the user belongs to as the authentication information to the web server system 102 in step S1206. On the other hand, when the authentication failed, the directory server 103 returns failure information representing a failure of the login to the web server system 102.

When receiving the authentication information from the directory server 103, the web server system 102 notifies the pull-print application 602 of start of a session. Simultaneously, the obtained authentication information is transferred to the pull-print application 602 as notification information in step S1207.

In step S1208, the pull-print application 602 transmits a request for obtaining a document list to the web server system 102 in accordance with the obtained authentication information. Here, the pull-print application 602 may determine a narrowing-down condition such as whether only a list of documents registered on the basis of user IDs is obtained or a list of all documents of a certain domain group in which the user belongs to are obtained. Note that a case where the list of documents registered on the basis of user IDs is obtained is described in this exemplary embodiment.

When receiving the request for obtaining a document list, the web server system 102 obtains a list of documents corresponding to the user ID from the DBMS 104 and transmits the obtained document list to the pull-print application 602 in step S1209.

When obtaining the list, the pull-print application 602 displays a document list 1504 of the pull-print screen 901 (printing screen display). Here, the pull-print application 602 displays the total number of obtained documents in a document count 1505. If all documents to be displayed in the document list 1504 are too many to simultaneously display in the document list 1504, paging processing is performed. FIG. 14 shows an example in which items corresponding to the documents are displayed within one page of the document list 1504.

Furthermore, the pull-print application 602 may have a function of displaying, when a detail button 1506 in the pull-print screen 901 is pressed, detailed information regarding a document in which a check box corresponding to the document is checked in the document list 1504 is displayed in another screen.

When a deleting button 1507 is pressed in the pull-print screen 901, the pull-print application 602 transmits a document deleting request to the web server system 102. When receiving a document deleting request, the web server system 102 deletes a document to be deleted in the DBMS 104.

When detecting a logout of the user by detecting a press of the hard key, for example, in step S1210, the authentication application 603 notifies the pull-print application 602 of the logout of the user in step S1211. When receiving the notification, the pull-print application 602 transmits a notification of the logout to the web server system 102 in step S1212. In step S1213, the session between the pull-print application 602 and the web server system 102 is terminated.

Note that an operation performed when a printing button 1508 in the pull-print screen 901 is pressed will be described hereinafter.

The pull-print application 602 generates the pull-print screen 901 as described above.

Pull-Print Sequence

Figures 17A, 17B:
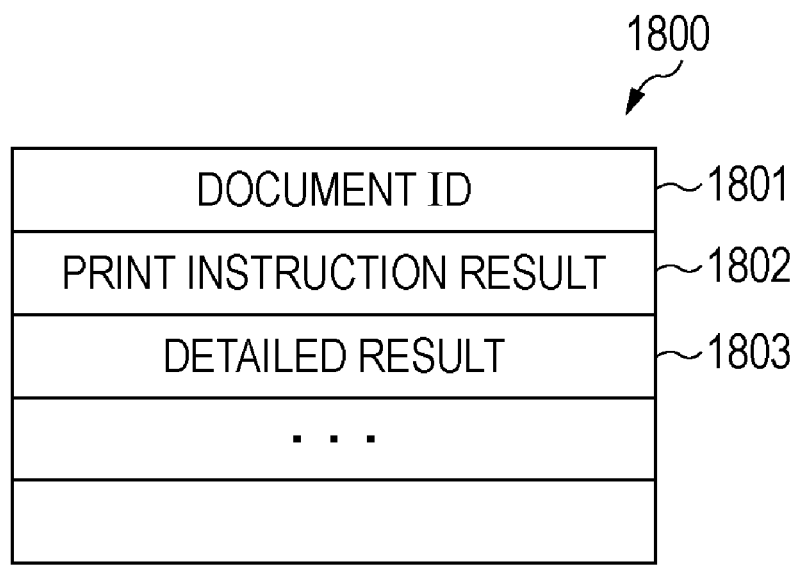
FIGS. 17A and 17B are diagrams illustrating an example of a print instruction management table and an example of a print instruction result list, respectively.

FIG. 16 is a diagram illustrating an example of a sequence of processes when a printing button 1508 displayed in the pull-print screen 901 is pressed. FIGS. 17A and 17B are diagrams illustrating an example of a print instruction management table 1800 and an example of a print instruction result list 1810, respectively.

When detecting a press of the printing button 1508 in step S1301, the pull-print application 602 obtains a document ID of a document which is marked. The pull-print application 602 generates the print instruction management table 1800 in accordance with the obtained document ID in step S1302.

The print instruction management table 1800 is used to manage progress of a print instruction in a pull-print operation. As shown in FIG. 17A, the print instruction management table 1800 includes a document ID 1801, a print instruction result 1802, and a detailed result 1803. The document ID 1801 corresponds to the document ID 305 included in the job information 300 and the document ID 501 included in the document table 500. The print instruction result 1802 includes symbols as shown in the print instruction result list 1810. The detailed result 1803 includes a cause of an error when a print instruction result represents an error.

In step S1303, the pull-print application 602 issues a print instruction to the web server system 102 (printing request). As the print instruction, the obtained document ID 1801 and information on a printing device 106 including the pull-print application 602 installed therein are transmitted. The information on the printing device 106 includes an address and model information of the printing device 106.

In step S1304, the web server system 102 specifies one of the printing device 106A to 106D. Specifically, the web server system 102 specifies one of the printing device 106A to 106D using the device information 400 managed in the DBMS 104 or the print server 201 on the basis of the obtained information on the printing device 106. If the information on the printing device 106 is not included in the information managed in the DBMS 104 or if the information on the printing device 106 is flaw information, the web server system 102 determines that the web server the print instruction is not acceptable. A result of the determination is transmitted to the pull-print application 602 as a print instruction result (1) in step S1306 which will next be described.

Subsequently, the web server system 102 determines whether the user who instructed the pull-print operation has an authority of printing of the specified document, that is, the web server system 102 performs an approval operation in step S1305. When the approval failed, the web server system 102 determines that the print instruction is not acceptable.

After determining whether the print instruction is acceptable in step S1304 and step S1305, the web server system 102 transmits a result of the determination as the print instruction result (1) to the pull-print application 602.

Furthermore, the web server system 102 may simultaneously receive a plurality of instructions for printing documents. In this case, the web server system 102 determines whether the plurality of print instructions are acceptable for individual print instructions, and results of the determinations are transmitted to the pull-print application 602.

When the approval of the authority was successfully performed, the web server system 102 issues a print instruction to the print server 201 in step S1307. As the print instruction, the device information 400 on the specified printing device 106 and the document ID 1801 are transmitted.

When receiving the print instruction, the print server 201 obtains document data using the document ID 1801 as a key from the DBMS 104 in step S1308.

Note that in a case where a document corresponding to the document data is not printable since the document has been deleted, for example, the print server 201 fails to obtain the document. In step S1309, the print server 201 transmits a print instruction result (2) which is a result of a determination as to whether the document is obtained to the web server system 102.

The web server system 102 stores the print instruction result (2). In this state, when receiving a confirmation of the print instruction result obtained by a periodic polling from the pull-print application 602, the web server system 102 transmits the print instruction result (2) stored therein to the pull-print application 602.

Then, the print server 201 prints the document which is successfully obtained (in step S1310 to step S1315) in accordance with the sequence described in FIG. 12.

The information which is registered in a schedule in the schedule application 601 in step S1315 is transmitted from the schedule application 601 to the pull-print application 602 in step S1316. When receiving the information, the pull-print application 602 updates information included in the print instruction management table 1800 generated in step S1302 in step S1317. A method for controlling the print instruction management table 1800 will be described in detail hereinafter.

The printing system performs the pull-print operation through the pull-print screen 901 as described above.

Print Instruction Management Flow

Figure 18A:
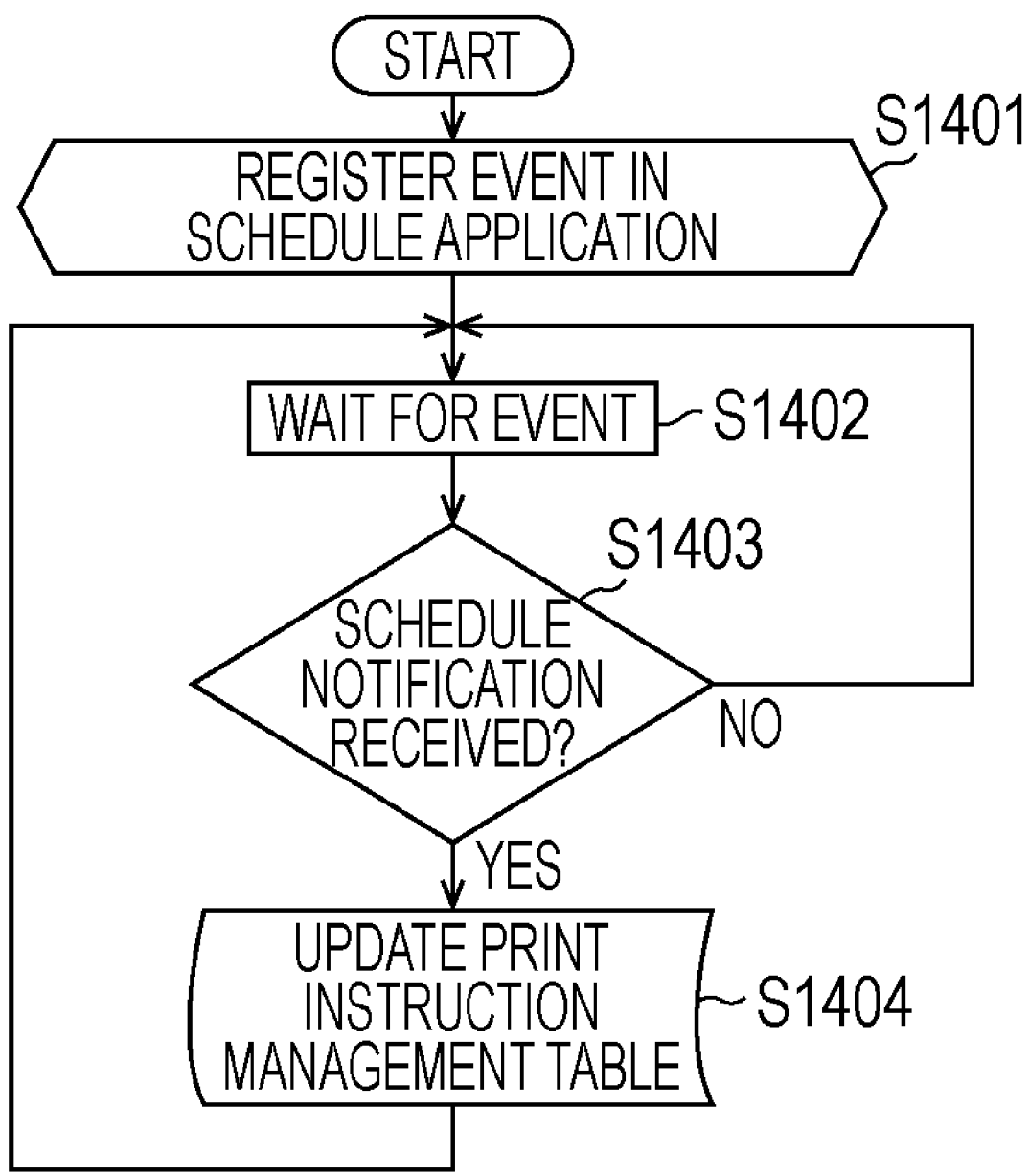
FIGS. 18A and 18B are flowcharts illustrating an example of processing of managing and controlling a print instruction in a pull-print operation.
Figure 18B:
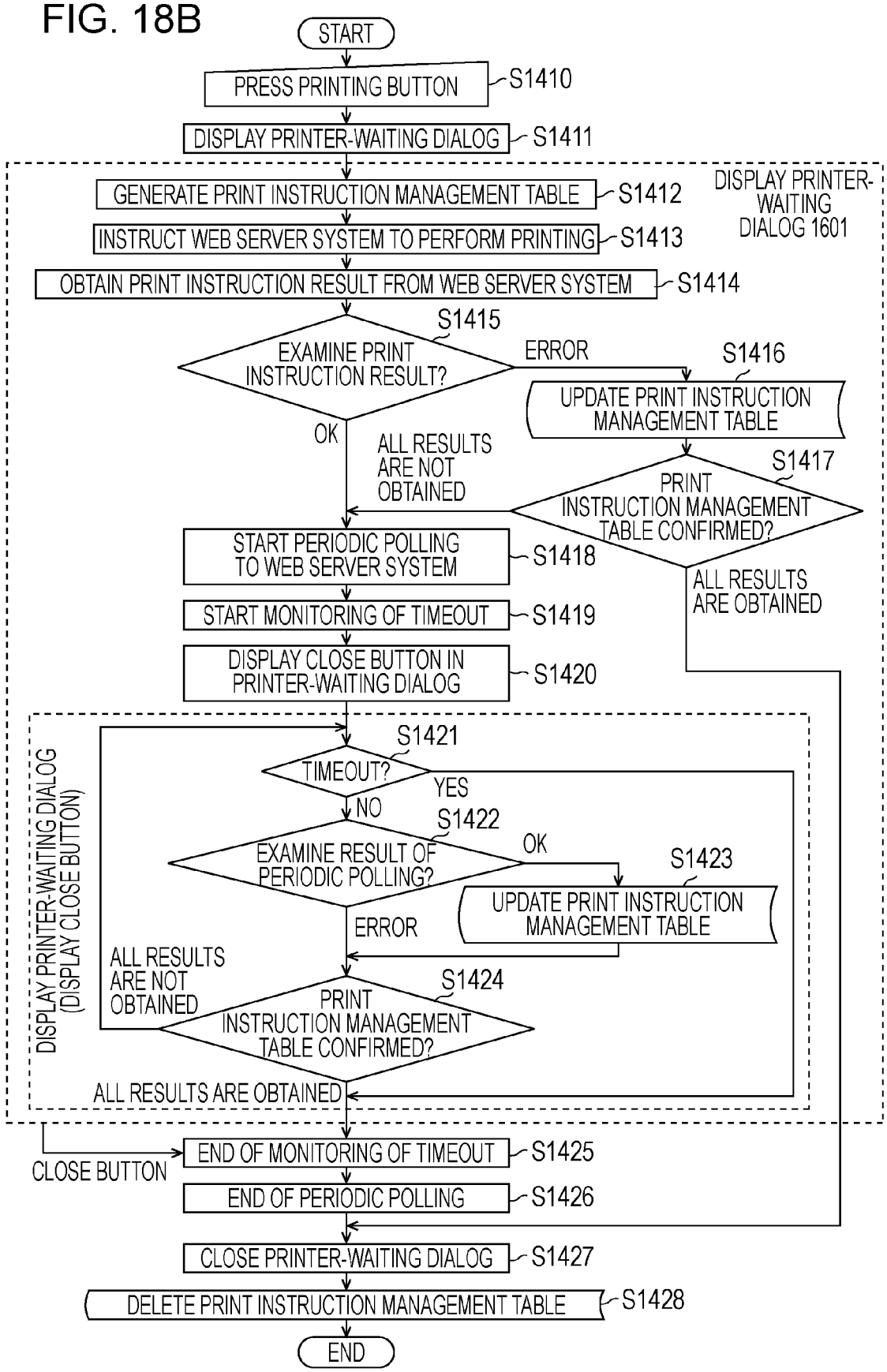

Management and control of a print instruction in the pull-print operation will be described with reference to flowcharts shown in FIGS. 18A and 18B. FIGS. 18A and 18B are flowcharts illustrating an example of processing of managing and controlling a print instruction in the pull-print operation.

As shown in FIGS. 18A and 18B, the management and the control of a print instruction in the pull-print operation are performed by two control operations operating in parallel.

Print Instruction Management Flow (First Control Operation)

A first control operation is performed in accordance with the flowchart shown in FIG. 18A. The flowchart shown in FIG. 18A corresponds to a portion of a sequence of the processes in step S1105 to step S1108 in which the print instruction is managed included in the print-job monitoring sequence shown in FIG. 13. Portions which do not relate to the management and the control of the print instruction have already described with reference to FIG. 13, and therefore, descriptions thereof are omitted.

The pull-print controller 902 included in the pull-print application 602 registers an event in the schedule application 601 in step S1401. In step S1402, the pull-print controller 902 waits for an event of a status change of a print job managed in the schedule application 601.

When receiving a notification of the event of a status change of a print job, the pull-print controller 902 determines in step S1403 whether the notification indicates that a new job is scheduled. When the determination is affirmative, the pull-print controller 902 proceeds to step S1404. On the other hand, when the determination is negative, the pull-print controller 902 returns to step S1402 where the pull-print controller 902 waits for an event. Note that the notified event includes the job information 300.

In step S1404, the pull-print controller 902 compares all document IDs 1801 of print instruction information items managed in the print instruction management table 1800 with the document ID 305 included in the notified job information 300. When it is determined that the document ID 305 matched one of the document IDs 1801, the pull-print controller 902 updates a print instruction result of a print instruction information item corresponding to the one of the document IDs 1801 to "OK", and the process returns to step S1402.

As described above, the pull-print controller 902 determines whether a job corresponding to an issued instruction is scheduled in the schedule application 601 by the first control operation.

Print Instruction Management Flow (Second Control Operation)

A second control operation is performed in accordance with the flowchart shown in FIG. 18B. The flowchart shown in FIG. 18B corresponds to a portion of a sequence of the processes of managing and controlling the print instruction included in the pull-print sequence shown in FIG. 16. Portions which do not relate to the management and the control of the print instruction have already described with reference to FIG. 16, and therefore, descriptions thereof are omitted.

Figure 19:
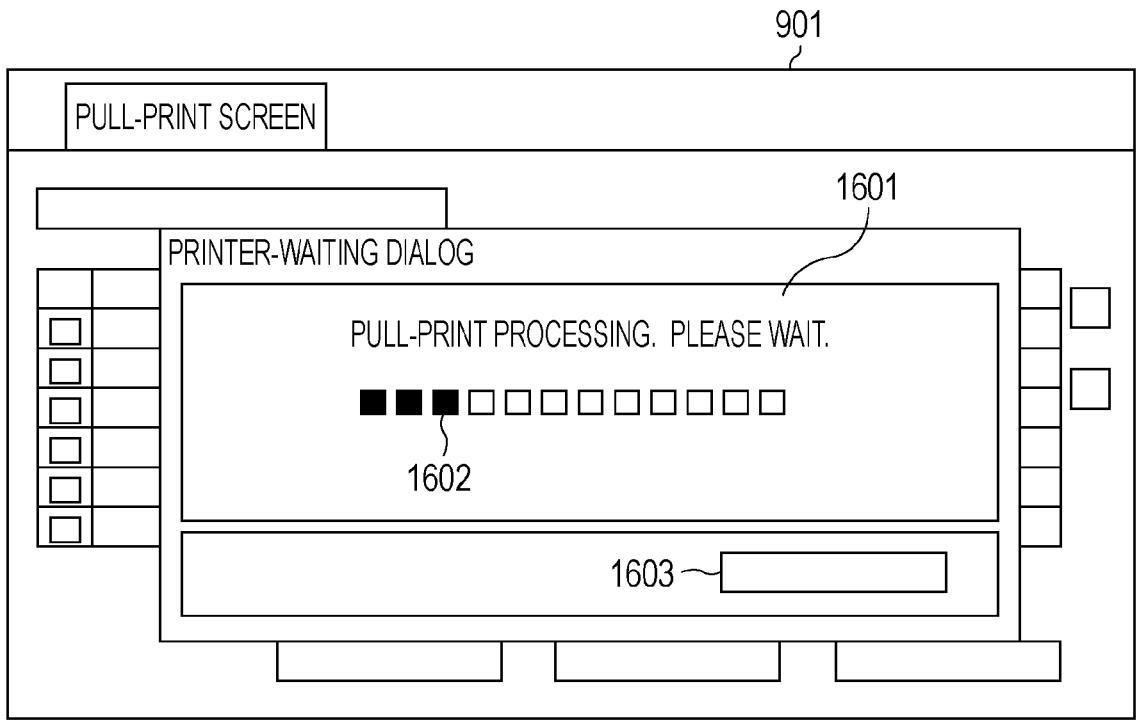
FIG. 19 is a diagram illustrating an example of a printer-waiting dialog screen.

The pull-print controller 902 included in the pull-print application 602 detects a press of the printing button 1508 in step S1410. In step S1411, the pull-print controller 902 displays a printer-waiting dialog screen 1601 shown in FIG. 19 in front of the pull-print screen 901 so as to overlap with the pull-print screen 901 (print-request limitation control). FIG. 19 is a diagram illustrating an example of the printer-waiting dialog screen 1601.

The printer-waiting dialog screen 1601 includes a progress-showing section 1602 which shows progress of a print-instruction control operation and a button 1603 used to close the printer-waiting dialog screen 1601. The progress-showing section 1602 shows a degree of the progress which increases as processing of the flowchart of FIG. 18B advances. The degree of the progress may be represented by difference in color or difference in color density of a display region which is a so-called progress bar, by a percentage, or by rotating a needle-like stick on a dial window.

When the printer-waiting dialog screen 1601 is first displayed, the close button 1603 is not allowed to be pressed.

The pull-print screen 901 is not allowed to be operated while the printer-waiting dialog screen 1601 is displayed, and therefore, any request is not issued to the web server system 102. Accordingly, the number of request issued from a single printing device 106 to the web server system 102 is limited by controlling a period of time in which the printer-waiting dialog screen 1601 is displayed (print-request limitation control).

As a method for preventing requests from being issued to the web server system 102, in addition to the method for displaying the printer-waiting dialog screen 1601 as described in this exemplary embodiment, the following method may be employed. That is, a method for banning uses of the printing button 1508 and the deleting button 1507 may be employed (print-request limitation control).

After the printer-waiting dialog screen 1601 is displayed, the pull-print controller 902 generates print instruction management tables 1800 for documents selected in the document list 1504 displayed in the pull-print screen 901 in step S1412. In print instruction results 1802 of the print instruction management tables 1800, a symbol "-" representing a state of waiting for information is stored.

Subsequently, the pull-print controller 902 issues a print instruction to the web server system 102 in step S1413, and obtains print-instruction results (1) from the web server system 102 in step S1414.

In step S1415, the pull-print controller 902 determines whether an error occurs in accordance with information on each of the obtained print-instruction results (1) for each document. When it is determined that an error occurred, the pull-print controller 902 sets a symbol "NG" representing generation of an error in print instruction results 1802 and a reason of the error is stored in detailed results 1803 in step S1416. The detailed results 1803 are obtained from the web server system 102. If it is determined that errors occurred in all the documents, the pull-print controller 902 determines that all results are obtained in step S1417, and the process proceeds to step S1427.

When it is determined that, among all the documents, a document corresponding to a print-instruction result (1) in which the symbol "NG" is not set was detected (that is, when a response representing that a print instruction is accepted was received), the pull-print controller 902 proceeds to step S1418.

In step S1418, the pull-print controller 902 starts periodic polling so as to obtain print-instruction results (2), that is, results of processing performed using the DBMS 104 from the web server system 102 (polling control). Time intervals of the periodic polling are preset in the pull-print application 602. However, the time intervals may be changeable using a setting screen, not shown.

In step S1419, the pull-print controller 902 starts monitoring of timeout of the periodic polling. The timeout of the periodic polling is set taking an assumption in which a processing time of the print instruction becomes accidentally long due to congestion of communication traffics of the pull-print system, trouble of a communication path, or server trouble into consideration. The timeout may not be set, that is, the periodic polling may not time out.

Figure 20:
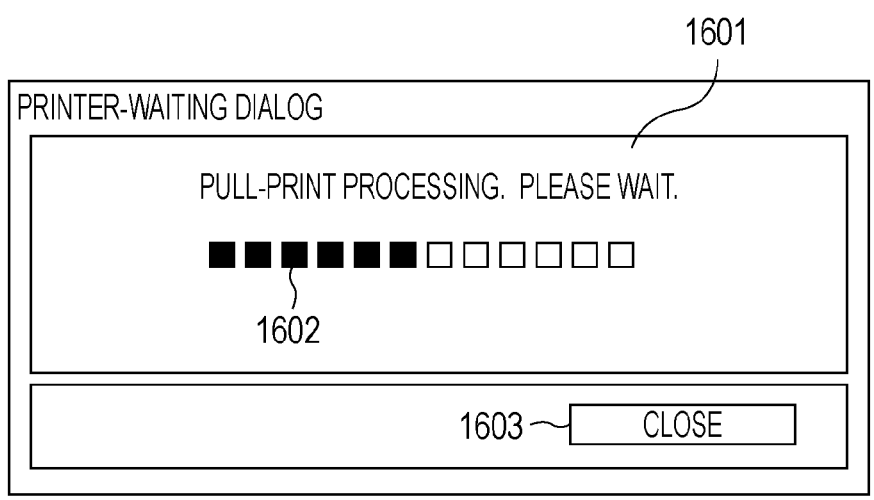
FIG. 20 is a diagram illustrating an example of a printer-waiting dialog screen including a close button activated.

In step S1420, the pull-print controller 902 displays the close button 1603 in the printer-waiting dialog screen 1601 so that the close button 1603 is allowed to be pressed (button display). FIG. 20 is a diagram illustrating an example of the printer-waiting dialog screen 1601 including the close button 1603 activated. Note that the close button 1603 may not to be displayed. The display of the close button 1603 relates to a range of control of loads to which the servers are subjected to in this pull-print system. In a case where a load to which the web server system 102 is subjected to is set as the control range, the close button 1603 is displayed here. On the other hand, in a case where a load to which the DBMS 104 is subjected to is set as the control range, it is determined that the close button 1603 is not displayed. When the close button 1603 is displayed and pressed, the pull-print controller 902 proceeds to step S1425. In this state, the user can subsequently issue another request. That is, a request can be subsequently issued before the processing performed using the DBMS 104 is terminated.

In step S1421, the pull-print controller 902 checks whether a timeout occurred. When the determination is affirmative, the process proceeds to step S1425. On the other hand, when the determination is negative or when the timeout was not set, the pull-print controller 902 examines the print instruction results (2) obtained through the periodic polling in step S1422. When it is determined that the print instruction results (2) are not transmitted to the web server system 102, the pull-print controller 902 proceeds step S1424.

When the print instruction results (2) are obtained from the web server system 102 in step S1422, the process proceeds to step S1423 where the pull-print controller 902 updates the results in the print instruction management tables 1800, and then, the process proceeds to step S1424.

Note that, although not shown in FIG. 18, it may be determined whether the close button 1603 is displayed when the print instruction results (2) are obtained. In a case where the control range of a load to which the DBMS 104 is subjected to is set as the control range, the pull-print controller 902 displays the close button 1603 here. On the other hand, in a case where the control range of a load to which the print server 201 is subjected to is set as the control range, the pull-print controller 902 determines not to display the close button 1603. In this state, when the close button 1603 is displayed and pressed, the pull-print controller 902 proceeds to step S1425 where the user can subsequently issue another request. That is, a request is subsequently issued before schedule processing performed using the print server 201 is terminated.

In step S1424, the pull-print controller 902 determines whether all print instruction results of the print instruction management tables 1800 are obtained. The determination as to whether all print instruction results are obtained is made along with the update operation in the flowchart of the first control operation described above. When it is determined that all the results were not obtained, the pull-print controller 902 returns to step S1421. On the other hand, when it is determined that all the results were obtained, the pull-print controller 902 proceeds to step S1425.

When all the print instruction results are obtained, the following condition is obtained: "all jobs instructed to be printed have symbols "NG" in the print instruction results (1) or the print instruction results (2), or are scheduled in the schedule application 601".

In a case where the timeout monitoring is performed, the pull-print controller 902 terminates the monitoring in step S1425. In step S1426, the pull-print controller 902 terminates the periodic polling to the web server system 102 (polling control).

In step S1427, the pull-print controller 902 closes the printer-waiting dialog screen 1601 when the printer-waiting dialog screen 1601 is displayed, and deletes the print instruction management tables 1800 in step S1428. The process is thus terminated.

As described above, the pull-print controller 902 manages and controls a pint instruction by the first and second control operations. With these operations, loads to which the servers are subjected to in the pull-print system are recognized and limited.

Furthermore, the progress of the pull-print operation is displayed for the user who instructed the pull-print operation.

Other Exemplary Embodiments

Objects of the present invention are attained as follows. That is, a storage medium (or a recording medium) which stores therein a program code of software which realizes functions of the foregoing exemplary embodiment is mounted in a system or a device. Then, a central calculation processing unit (CPU (Central Processing Unit) or MPU (Micro Processing Unit)) included in the system or the device reads and executes the program code stored in the storage medium. In this case, the program code itself read from the storage medium realizes the functions described in the foregoing exemplary embodiment, and therefore, the storage medium which stores therein the program code is included in the present invention.

Furthermore, by executing the program code read using the central calculation processing unit included in the system or the device, an operating system (OS), for example, operating in the system or the device performs a part of or all processing in accordance with an instruction of the program code. The present invention includes a case where the functions of the foregoing exemplary embodiment are realized by the processing.

It is assumed that the program code read from the storage medium is written in a function expansion card inserted into the system or the device or a memory included in a function expansion unit connected to the system or the device. The present invention includes a case where the CPU, for example, included in the function expansion card or the function expansion unit performs a part of or all the processing in accordance with an instruction of the program code so that the functions of the foregoing exemplary embodiment are realized.

In a case where the present invention is applied to the storage medium, the storage medium stores therein program codes corresponding to the flowcharts described above.

According to the foregoing exemplary embodiment, the pull-print operation is prevented from being continuously performed until loads to which the servers are subjected to are reduced. Furthermore, since periodic polling for checking request results is performed, progress can be displayed in detail.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Application No. 2007-249780 filed Sep. 26, 2007, which is hereby incorporated by reference herein in its entirety.

What is claimed is:

1. An image processing apparatus having a scheduling unit configured to manage print reservation information registered by a server, comprising:
   a display unit configured to display in a display device a print screen including document information items regarding documents stored in a device which communicates with the image processing apparatus through a network;
   a request unit configured to request the server through the network to print a document corresponding to a document information item selected from among the document information items included in the print screen;

a detection unit configured to detect registration of print reservation information in a scheduling unit regarding a print reservation of the document that the request unit requests the server to print;

a control unit configured to prevent a new print request from being issued by the request unit for a period of time from when the request unit requests the server to print the document to when the detection unit detects registration of print reservation information in the scheduling unit regarding the print reservation of the document that the request unit request the server to print.

2. The image processing apparatus according to claim 1, wherein the print screen further includes a print button, the print request unit requests printing of the document corresponding to the document information item selected from among the document information items included in the print screen in accordance with a press of the print button, and the print-request limitation control unit displays a printer-waiting screen in a front of the print screen for the period of time from when the print request unit requests the server to print the document to when the registration of the print reservation information regarding the print reservation of the document in the print reservation information management unit is detected so as to prevent a new print request from being issued.

3. The image processing apparatus according to claim 2, further comprising:

a button display unit configured to display a button used to close the printer-waiting screen in the printer-waiting screen when a response in which the request is accepted is transmitted from the server.

4. The image processing apparatus according to claim 1, wherein the print screen further includes a print button, the print request unit requests printing of the document corresponding to the document information item selected from among the document information items included in the print screen in accordance with a press of the print button, and the print-request limitation control unit deactivates the print button for the period of time from when the print request unit requests the server to print the document to when the registration of the print reservation information regarding the print reservation of the document in the print reservation information management unit is detected so as to prevent a new print request from being issued.

5. A print request making method employed in an image processing apparatus having a scheduling unit configured to manage print reservation information registered by a server, comprising:

displaying a including document information items regarding documents stored in a device which communicates with the image processing apparatus through a network;

requesting the server through the network to print a document corresponding to a document information item selected from among the document information items included in the print screen;

detecting registration of print reservation information in the scheduling unit regarding a print reservation of the document that the server was requested to print; and preventing a new print request from being issued for a period of time from when the server is requested to print the document in the requesting step to when registration of print reservation information in the scheduling unit regarding the print reservation of the document that the server was requested to print.

6. The print request making method according to claim 5, wherein the print screen further includes a print button, printing of the document corresponding to the document information item selected from among the document information items included in the print screen is requested in the requesting step, and a printer-waiting screen is displayed in a front of the print screen for the period of time from when the print request unit requests the server to print the document to when the registration of the print reservation information regarding the print reservation of the document in the print reservation information management unit is detected so as to prevent a new print request from being issued in the preventing step.

7. The print request making method according to claim 6, further comprising:

displaying a button used to close the printer-waiting screen in the printer-waiting screen when a response in which the request is accepted is transmitted from the server.

8. The print request making method according to claim 5, wherein the print screen further includes a print button, printing of the document corresponding to the document information item selected from among the document information items included in the print screen is requested in accordance with a press of the print button in the requesting step, and the print button is deactivated for the period of time from when the print request unit requests the server to print the document to when the registration of the print reservation information regarding the print reservation of the document in the print reservation information management unit is detected so as to prevent a new print request from being issued in the preventing step.

9. A non-transitory computer readable storage medium storing a program which causes a computer to function as:

a scheduling unit configured to manage print reservation information registered by a server:

a display unit configured to display in a display device a print screen including document information items regarding documents stored in a device which communicates with the image processing apparatus through a network;

a request unit configured to request the server through the network to print a document corresponding to a document information item selected from among the document information items included in the print screen;

a detection unit configured to detect registration of print reservation information in a scheduling unit regarding a print reservation of the document that the request unit requests the server to print;

a control unit configured to prevent a new print request from being issued by the request unit for a period of time from when the request unit requests the server to print the document to when the detection unit detects registration of print reservation information in the scheduling unit regarding the print reservation of the document that the request unit request the server to print.

* * * * *